United States Patent [19]
Herzig et al.

[11] Patent Number: 5,665,125
[45] Date of Patent: Sep. 9, 1997

[54] MIXTURES OF FIBRE-REACTIVE RING-OPENED PHTHALIMIDYLAZO DYES

[75] Inventors: Paul Herzig, Basel; Anton Andreoli, Riehen, both of Switzerland

[73] Assignee: Ciba-Geigy Corporation, Tarrytown, N.Y.

[21] Appl. No.: 579,189

[22] Filed: Dec. 27, 1995

Related U.S. Application Data

[62] Division of Ser. No. 451,354, May 26, 1995, Pat. No. 5,532,345.

[30] Foreign Application Priority Data

May 30, 1994 [CH] Switzerland .................. 1679/94

[51] Int. Cl.[6] .................. C09B 62/00; D06P 3/66; D06P 1/382; D06P 1/384
[52] U.S. Cl. .................. 8/543; 8/549; 8/639; 8/641; 8/918
[58] Field of Search .................. 8/543, 549, 639, 8/641, 673, 918

[56] References Cited

U.S. PATENT DOCUMENTS

| | | | |
|---|---|---|---|
| 2,533,178 | 12/1950 | Randall et al. | 260/326 |
| 3,974,160 | 8/1976 | Seiler et al. | 534/635 X |
| 4,039,522 | 8/1977 | Weaver et al. | 534/789 |
| 4,562,249 | 12/1985 | Schwander et al. | 534/641 |
| 4,734,490 | 3/1988 | Schwander et al. | 534/640 X |
| 4,754,024 | 6/1988 | Schwander | 534/640 X |

FOREIGN PATENT DOCUMENTS

| | | |
|---|---|---|
| 1157906 | 7/1969 | United Kingdom . |
| 1504795 | 3/1978 | United Kingdom . |
| 1561420 | 2/1980 | United Kingdom . |

*Primary Examiner*—Margaret Einsmann
*Attorney, Agent, or Firm*—Kevin T. Mansfield

[57] ABSTRACT

Mixtures comprising a compound of the formula

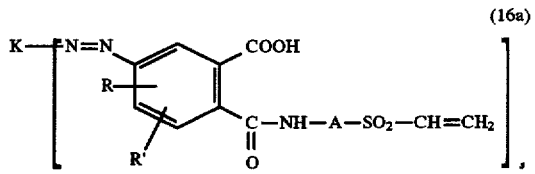

(16a)

and a compound of the formula

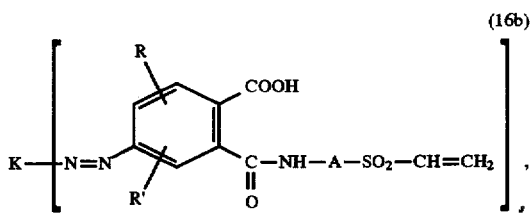

(16b)

in which K is the radical of a coupling component, s is the same in the compounds of formulae (16a) and (16b) and is the number 1 or 2, R and R' are each hydrogen, sulfo, hydroxyl, $C_1$–$C_4$alkoxy, halogen or cyano, A is $C_1$–$C_6$alkylene which is optionally substituted by halogen, hydroxyl, sulfato, carboxyl, cyano, $C_2$–$C_4$alkanoyloxy, $C_1$–$C_4$alkoxycarbonyl or carbamoyl or interrupted by a group —O— or —NR"—, or is $C_1$–$C_6$alkylenephenylene which is unsubstituted or substituted in the phenyl part by $C_1$–$C_4$alkyl, $C_1$–$C_4$alkoxy, halogen or sulfo, and R" is hydrogen or $C_1$–$C_4$alkyl, and the ratio of the compounds of formulae (16a) and (16b) is about 1:1, are suitable as fibre-reactive dyes for dyeing or printing widely varying fibre materials.

11 Claims, No Drawings

MIXTURES OF FIBRE-REACTIVE RING-OPENED PHTHALIMIDYLAZO DYES

This is a Division of Ser. No. 08/451,354, filed May 26, 1995 now U.S. Pat. No. 5,532,345.

The present invention relates to novel reactive dyes, processes for their preparation and their use.

The practice of dyeing with reactive dyes has recently led to increased requirements on the quality of the dyeings and the profitability of the dyeing process. Consequently, there continues to be a need for novel reactive dyes which have improved properties, especially in respect of application.

Reactive dyes which have an adequate substantivity and at the same time a good ease of washing out of the non-fixed portions are required nowadays for dyeing. They should furthermore have a good tinctorial yield and high reactivity, and dyeings with high degrees of fixing should be produced in particular. The known dyes do not meet these requirements in all the properties.

The present invention is therefore based on the object of discovering novel, improved reactive dyes for dyeing and printing fibre materials which have the qualities characterized above to a high degree. The novel dyes in particular should have high fixing yields and high fibre-dye bond stabilities, and furthermore the portions which are not fixed to the fibre should be easy to wash out. They should furthermore produce dyeings having good all round fastness properties, for example lightfastness and wetfastness properties.

It has been found that the object described is largely achieved by the novel reactive dyes as defined below.

The present invention relates to compounds of the formula

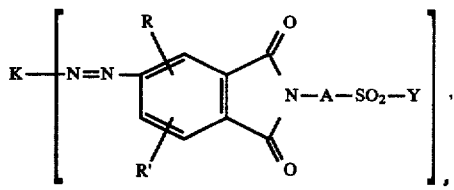

in which
K is the radical of a coupling component,
s is the number 1 or 2,
R and R' independently of one another are each hydrogen, sulfo, hydroxyl, $C_1$–$C_4$alkoxy, haloygen or cyano,
A is $C_1$–$C_6$alkylene which is unsubstituted or substituted by halogen, hydroxyl, sulfato, carboxyl, cyano, $C_2$–$C_4$alkanoyloxy, $C_1$–$C_4$alkoxycarbonyl or carbamoyl or interrupted by a group —O— or —NR"—, or is $C_1$–$C_6$alkylenephenylene which is unsubstituted or substituted in the phenyl part by $C_1$–$C_4$alkyl, $C_1$–$C_4$alkoxy, halogen or sulfo,
R" is hydrogen or $C_1$–$C_4$alkyl,
Y is vinyl or a radical —$CH_2$–$CH_2$-U, and
U is a leaving group which can be split off under alkaline conditions.

The term sulfo here generally includes both the free acid —$SO_3H$ and any salt form, for example an alkali metal, alkaline earth metal or ammonium salt or the salt of an organic amine, such as the sodium, potassium, lithium or ammonium salt or the salt of triethanolamine.

$C_1$–$C_4$Alkyl is generally methyl, ethyl, n- or iso-propyl or n-, iso-, sec- or tert-butyl. $C_1$–$C_4$Alkoxy is generally methoxy, ethoxy, n- or iso-propoxy or n-, iso-, sec- or tert-butoxy, and preferably methoxy or ethoxy. Halogen is generally, for example, bromine or chlorine. Examples of $C_2$–$C_4$alkanoyloxy are acetyl or propionyl, and examples of $C_1$–$C_4$alkoxycarbonyl are methoxycarbonyl or ethoxycarbonyl. $C_1$–$C_6$Alkylene is generally to be understood as meaning $C_1$–$C_6$alkylene which is straight-chain-chain or branched in any manner; examples are methylene, 1,1- or 1,2-ethylene, 1,2- or 1,3-propylene, 1,2-, 1,3-, 1,4- or 2,3-butylene, 1,4-, 2,3- or 2,4-pentylene, 2-methyl-1,5-pentylene and 1,6-hexylene, it being possible for these radicals to be substituted as stated or, with the exception of methylene, interrupted by a heteroatom —O— or —NR"—.

R and R' independently of one another are preferably hydrogen, sulfo, chlorine, bromine, hydroxyl, methoxy or cyano; particularly preferably, R is hydrogen, sulfo, chlorine, bromine or cyano and R' is hydrogen; especially preferably, R is hydrogen or sulfo and R' is hydrogen. A particularly preferred embodiment of the invention relates to compounds of the formula (1) in which R and R' are each hydrogen.

R" is preferably hydrogen, methyl or ethyl, and particularly preferably hydrogen.

A $C_1$–$C_6$alkylenephenylene radical A is preferably methylenephenylene or ethylenephenylene which is unsubstituted or substituted in the phenyl part by methyl, methoxy, chlorine or sulfo, and particularly preferably methylenephenylene.

A is preferably an unsubstituted $C_1$–$C_6$alkylene radical or a radical of the formula

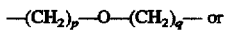

in which p and q independently of one another are each an integer from 1 to 6.

A is particularly preferably a $C_2$–$C_4$alkylene radical or a radical of the formula

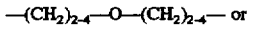

A is especially preferably 1,2-ethylene, 1,3-propylene, 1,4-butylene or a radical of the formula

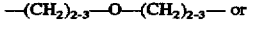

A particularly preferred embodiment of the present invention relates to compounds of the formula (1) in which A is 1,2-ethylene, 1,3-propylene or a radical of the formula —$(CH_2)_2$—O—$(CH_2)_2$—.

Suitable leaving groups U which can be split off under alkaline conditions are, for example, halogen, such as chlorine or bromine, acyloxy, such as acetoxy or benzoyloxy, phosphato, sulfato or thiosulfato.

Examples of suitable radicals Y are accordingly vinyl, β-bromo- or βchloroethyl, β-acetoxyethyl, β-benzoyloxyethyl, β-phosphatoethyl, β-sulfatoethyl and β-thiosulfatoethyl. Y is preferably vinyl or β-sulfatoethyl.

Compounds which are of particular interest are those of the abovementioned formula (1) in which R is hydrogen, sulfo, chlorine, bromine or cyano;
R' is hydrogen;
A is unsubstituted $C_1$–$C_6$alkylene or a radical of the formula

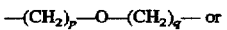

$-(CH_2)_p-NH-(CH_2)_q-$, in which p and q independently of one another are each an integer from 1 to 6; and Y is vinyl, β-bromo- or β-chloroethyl, β-acetoxyethyl, β-benzoyloxyethyl, β-phosphatoethyl, β-sulfatoethyl or β-thiosulfatoethyl.

Compounds which are of special interest are those of the abovementioned formula (1) in which R is hydrogen or sulfo;

R' is hydrogen;

A is $C_2$-$C_4$alkylene or a radical of the formula $-(CH_2)_{2-4}-O-(CH_2)_{2-4}-$ or $-(CH_2)_{2-4}-NH-(CH_2)_{2-4}-$; and Y is vinyl or β-sulfatoethyl.

A particularly preferred embodiment of the present invention provides compounds of the abovementioned formula (1) in which R and R' are each hydrogen, A is 1,2-ethylene, 1,3-propylene or a radical of the formula $-(CH_2)_2-O-(CH_2)_2-$ and Y is β-sulfatoethyl.

K is, for example, the radical of a coupling component of the benzene, naphthalene, naphthylazobenzene, phenylazonaphthalene, 4-alkyl-6-hydroxy-2-pyridone, 2,5-diamino-4-alkylpyridine, 1-aryl-5-pyrazolone or 1-aryl-5-aminopyrazole series, it being possible for this radical to contain substituents customary in dyes and, if appropriate, one or more fibre-reactive groups.

Examples of substituents are: alkyl groups having 1 to 12 carbon atoms, in particular 1 to 4 carbon atoms, such as methyl, ethyl, n- or iso-propyl or n-, iso-, sec- or tert-butyl, alkoxy groups having 1 to 8 carbon atoms, in particular 1 to 4 carbon atoms, such as methoxy, ethoxy, n- or iso-propoxy or n-, iso-, sec- or tert-butoxy, $C_1$-$C_4$alkoxy which is substituted in the alkyl part, for example by hydroxyl, $C_1$-$C_4$alkoxy or sulfato, for example 2-hydroxyethoxy, 3-hydroxypropoxy, 2-sulfatoethoxy, 2-methoxyethoxy or 2-ethoxyethoxy, acylamino groups having 2 to 8 carbon atoms, in particular $C_2$-$C_4$alkanoylamino groups, such as acetylamino or propionylamino, benzoylamino or $C_2$-$C_4$alkoxycarbonylamino groups, such as methoxycarbonylamino or ethoxycarbonylamino, amino, N-mono- or N,N-di-$C_1$-$C_4$alkylamino which is unsubstituted or substituted in the alkyl part, for example by hydroxyl, sulfo, sulfato or $C_1$-$C_4$alkoxy, for example methylamino, ethylamino, N,N-dimethyl- or N,N-diethylamino, sulfomethylamino, β-hydroxyethylamino, N,N-di-(2-hydroxyethylamino) or N-β-sulfatoethylamino, phenylamino which is unsubstituted or substituted in the phenyl part by methyl, methoxy, halogen or sulfo, N—$C_1$–$C_4$alkyl-N-phenylamino which is unsubstituted or substituted in the alkyl part by hydroxyl, sulfo or sulfato or unsubstituted or substituted in the phenyl part by methyl, methoxy, halogen or sulfo, for example N-methyl-N-phenylamino, N-ethyl-N-phenylamino, N-β-hydroxyethyl-N-phenylamino or N-β-sulfoethyl-N-phenylamino, naphthylamino which is unsubstituted or substituted by sulfo, alkanoyl groups having 2 to 8 carbon atoms, in particular 2 to 4 carbon atoms, for example acetyl or propionyl, benzoyl, alkoxycarbonyl having 1 to 4 carbon atoms in the alkoxy radical, such as methoxycarbonyl or ethoxycarbonyl, alkylsulfonyl having 1 to 4 carbon atoms, such as methylsulfonyl or ethylsulfonyl, phenyl- or naphthylsulfonyl, trifluoromethyl, nitro, cyano, hydroxyl, halogen, such as fluorine, chlorine or bromine, carbamoyl, N—$C_1$–$C_4$alkylcarbamoyl, such as N-methylcarbamoyl or N-ethylcarbamoyl, sulfamoyl, N—$C_1$–$C_4$alkylsulfamoyl, such as N-methylsulfamoyl, N-ethylsulfamoyl, N-propylsulfamoyl, N-isopropylsulfamoyl or N-butylsulfamoyl, N-(β-hydroxyethyl)-sulfamoyl, N,N-di-(β-hydroxyethyl)-sulfamoyl, N-phenylsulfamoyl, ureido, carboxyl, sulfomethyl, sulfo or sulfato, and fibre-reactive radicals. The alkyl radicals furthermore can be interrupted by oxygen (—O—).

Fibre-reactive radicals are to be understood as meaning those which are capable of reacting with the hydroxyl groups of cellulose, the amino, carboxyl, hydroxyl and thiol groups in wool and silk, or the amino and possibly carboxyl groups of synthetic polyamides to form covalent chemical bonds. The fibre-reactive radicals are as a rule bonded to the dye radical directly or by a bridge member. Suitable fibre-reactive radicals are, for example, those which contain at least one substituent which can be split off on an aliphatic, aromatic or heterocyclic radical, or in which the radicals mentioned contain a radical suitable for reaction with the fibre material, for example a vinyl radical.

If K contains a fibre-reactive radical, this is preferably one of the formula

 (2a),

 (2b) or

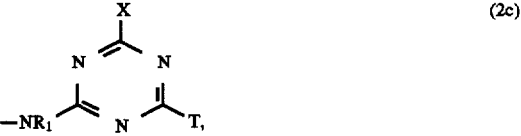 (2c)

in which

X is halogen, 3-carboxypyridin-1-yl or 3-carbamoylpyridin-1-yl,

T independently is as defined for X or is hydroxyl, $C_1$–$C_4$alkoxy, phenoxy, $C_1$–$C_4$alkylthio, morpholino, amino which is unsubstituted or substituted by non-reactive radicals, or a reactive radical of the formula

 (3a)

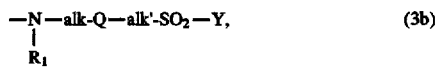 (3b)

 (3c)

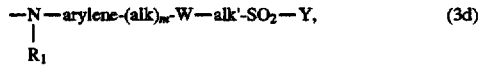 (3d)

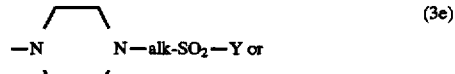 (3e)

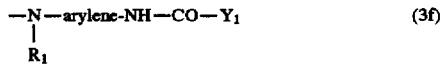 (3f)

$R_1$ is hydrogen or $C_1$–$C_4$alkyl, $R_2$ is hydrogen, $C_1$–$C_4$alkyl which is unsubstituted or substituted by hydroxyl, sulfo, sulfato, carboxyl or cyano, or a radical

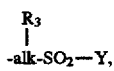

$R_3$ is hydrogen, hydroxyl, sulfo, sulfato, carboxyl, cyano, halogen, $C_1$-$C_4$alkoxycarbonyl, $C_1$-$C_4$alkanoyloxy, carbamoyl or the group —$SO_2$—Y, alk and alk' independently of one another are $C_1$-$C_6$alkylene, arylene is a phenylene or naphthylene radical which is unsubstituted or substituted by sulfo, carboxyl, $C_1$-$C_4$alkyl, $C_1$-$C_4$alkoxy or halogen, $Y_1$ is a group —$CHX_2$—$CH_2X_2$ or —$CX_2$=$CH_2$ and $X_2$ is chlorine or bromine, Q is a radical —O— or —NR"—, in which R" is as defined above, W is a group —$SO_2$—$NR_2$—, —$CONR_2$— or —$NR_2CO$—, m is the number 0 or 1, n is an integer from 1 to 6 and Y independently is as defined above.

The variable $R_1$ is preferably hydrogen, methyl or ethyl, and particularly preferably hydrogen.

The variable n is preferably the number 1, 2, 3 or 4, particularly preferably the number 2 or 3, and especially preferably the number 2.

An amino T which is unsubstituted or substituted by non-reactive radicals can be amino, N—$C_1$-$C_4$alkylamino or N,N-di-$C_1$-$C_4$alkylamino, in which the alkyl is unsubstituted or substituted, for example, by sulfo, sulfato, hydroxyl, carboxyl or phenyl, cyclohexylamino, N—$C_1$-$C_4$alkyl-N-phenylamino or phenylamino or naphthylamino, in which the phenyl or naphthyl is unsubstituted or substituted, for example by $C_1$-$C_4$alkyl, $C_1$-$C_4$alkoxy, $C_2$-$C_4$alkanoylamino, carboxyl, sulfo or halogen.

Examples of suitable non-reactive radicals T are amino, methylamino, ethylamino, β-hydroxyethylamino, N,N-di-β-hydroxyethylamino, β-sulfoethylamino, cyclohexylamino, morpholino, o-, m- or p-chlorophenylamino, o-, m- or p-methylphenylamino, o-, m- or p-methoxyphenylamino, o-, m- or p-sulfophenylamino, disulfophenylamino, o-carboxyphenylamino, 1- or 2-naphthylamino, 1-sulfo-2-naphthylamino, 4,8-disulfo-2-naphthylamino, N-ethyl-N-phenylamino, N-methyl-N-phenylamino, methoxy, ethoxy, n- or iso-propoxy and hydroxyl.

A non-reactive radical T is preferably $C_1$-$C_4$alkoxy, $C_1$-$C_4$alkylthio, hydroxyl, amino, N-$C_1$-$C_4$-alkylamino, which is unsubstituted in the alkyl part or substituted by hydroxyl, sulfato or sulfo, morpholino, phenylamino or N-$C_1$-$C_4$alkyl-N-phenylamino, in which the phenyl in each case is unsubstituted or substituted by sulfo, carboxyl, acetylamino, methyl or methoxy.

Particularly preferred non-reactive radicals T are amino, N.-methylamino, N-ethylamino, β-sulfoethylamino, morpholino, phenylamino, 2-, 3- or 4-sulfophenylamino or N—$C_1$-$C_4$alkyl-N-phenylamino.

X is preferably halogen, for example fluorine, chlorine or bromine, and particularly preferably chlorine or fluorine.

$X_2$ is preferably bromine.

ark and alk' independently of one another are, for example, a methylene, ethylene, 1,3-propylene, 1,4-butylene, 1,5-pentylene or 1,6-hexylene radical or branched isomers thereof.

Preferably, ark and alk' independently of one another are each a $C_1$-$C_4$alkylene radical, and particularly preferably an ethylene radical or propylene radical.

arylene is preferably a 1,3- or 1,4-phenylene radical which is unsubstituted or substituted, for example by sulfo, methyl, methoxy or carboxyl, and particularly preferably an unsubstituted 1,3- or 1,4-phenylene radical.

$R_2$ is preferably hydrogen or $C_1$-$C_4$arkyl, such as methyl, ethyl, propyl, isopropyl, butyl, isobutyl, sec-butyl or tert-butyl. $R_2$ is particularly preferably hydrogen.

$R_3$ is preferably hydrogen.

Q is preferably —NH— or —O—, and particularly preferably —O—.

W is preferably a group of the formula —CONH— or —NHCO—, in particular a group of the formula —CONH—.

Preferred reactive radicals of the formulae (3a) to (3f) are those in which

W is a group of the formula —CONH— or —NHCO—, $R_1$, $R_2$ and $R_3$ are each hydrogen, Q is the radical —O— or —NH—, ark and alk' independently of one another are each ethylene or propylene, arylene is phenylene which is unsubstituted or substituted by methyl, methoxy, carboxyl or sulfo, Y is vinyl or β-sulfatoethyl and $Y_1$ is —CHBr—$CH_2$Br or —CBr=$CH_2$.

If the radical K contains a reactive radical, this is particularly preferably a radical of the formula (2a) defined above; (2b) in which $R_1$ is hydrogen and n is the number 2 or 3;

or (2c) in which

T is $C_1$-$C_4$alkoxy, $C_1$-$C_4$alkylthio, hydroxyl, amino, N—$C_1$-$C_4$-alkylamino, which is unsubstituted in the alkyl part or substituted by hydroxyl, sulfato or sulfo, morpholino, phenylamino or N—$C_1$-$C_4$alkyl-N-phenylamino, in which the alkyl is unsubstituted or substituted by hydroxyl, sulfo or sulfato and the phenyl is in each case unsubstituted or substituted by sulfo, carboxyl, acetylamino, methyl or methoxy, or a fibre-reactive radical of the formula

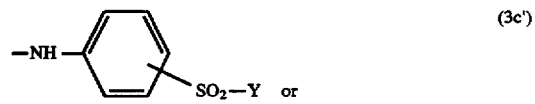

(3c')

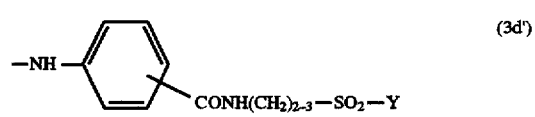

(3d')

in which

Y in each case is as defined above.

If s in formula (1) is the number 1, K is, for example, a radical of the formula

(4a)

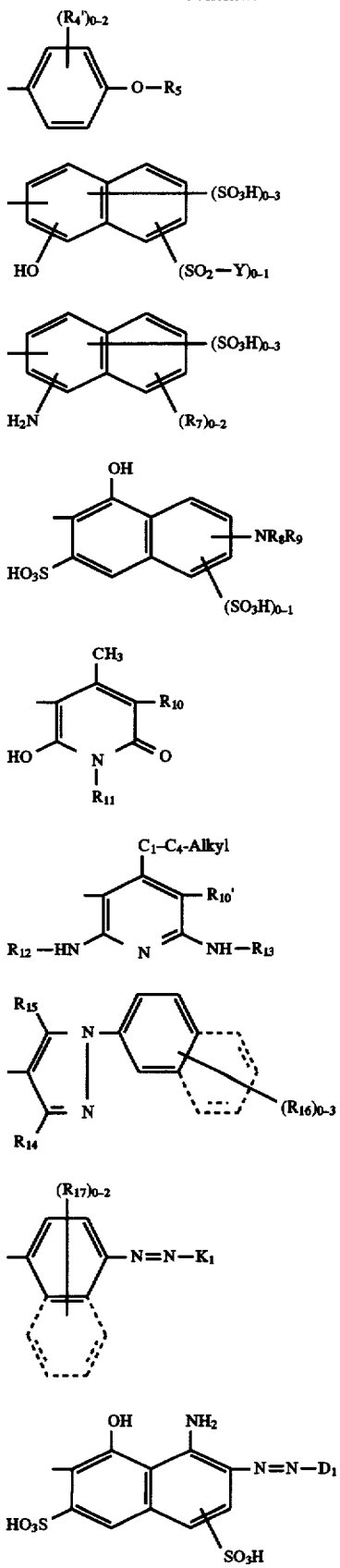

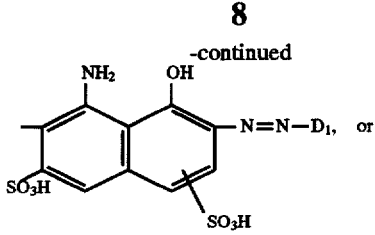

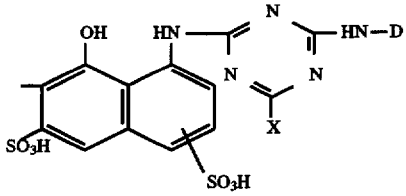

in which (R₄)₀₋₃ is 0 to 3 identical or different radicals R₄, for example from the group consisting of $C_1$-$C_4$alkyl, $C_1$-$C_4$alkoxy, $C_1$-$C_4$alkoxy which is substituted in the alkyl part by hydroxyl, $C_1$-$C_4$alkoxy or sulfato, halogen, carboxyl, hydroxyl, amino, N-mono- or N,N-di-$C_1$-$C_2$alkylamino, $C_2$-$C_4$alkanoylamino, ureido, sulfo, $C_1$-$C_4$alkylsulfonyloxy, $C_1$-$C_4$alkylsulfonylamino or a reactive radical of the formula (2c) defined above;

(R₄')₀₋₂ is 0 to 2 identical or different radicals R₄' from the group consisting of $C_1$-$C_4$alkyl, $C_1$-$C_4$alkoxy, phenoxy, halogen, sulfo and hydroxyl;

R₅ is hydrogen or $C_1$-$C_4$alkyl;

R₅' independently is as defined for to R₅, or is $C_2$-$C_4$alkanoyl, $C_1$-$C_4$hydroxyalkyl, $C_1$-$C_4$sulfatoalkyl, $C_1$-$C_4$alkoxyalkyl or phenyl which is unsubstituted or substituted by methyl, methoxy, chlorine or sulfo;

R₆ is hydrogen, $C_1$-$C_4$alkyl or phenyl;

(R₇)₀₋₂ is 0 to 2 identical or different substituents from the group consisting of hydroxyl and a fibre-reactive radical of the formula (2a) defined above;

R₈ is hydrogen or $C_1$-$C_4$alkyl which is unsubstituted or substituted by hydroxyl, $C_1$-$C_4$alkoxy, sulfato, sulfo, halogen or cyano;

R₉ independently is as defined for R₈ or is $C_2$-$C_4$alkanoyl, benzoyl or a fibre-reactive radical of the formula (2c) defined above;

R₁₀ and R₁₀' independently of one another are each carbamoyl, sulfomethyl or cyano;

R₁₁ is hydrogen or $C_1$-$C_4$alkyl, which is unsubstituted or substituted by a radical of the formula (2c);

R₁₂ and R₁₃ independently of one another are each hydrogen or $C_1$-$C_{12}$alkyl which is unsubstituted or substituted by hydroxyl, $C_1$-$C_4$alkoxy, phenoxy, sulfato, sulfo, carboxyl, amino or N-mono- or N,N-di-$C_1$-$C_4$alkylamino, which in its turn can be substituted in the alkyl part by hydroxyl, $C_1$-$C_4$alkoxy, phenoxy, sulfato, sulfo, carboxyl or a fibre-reactive radical of the formula (2c) defined above, and/or with the exception of methyl is uninterrupted or interrupted by —O—;

R₁₄ is methyl or carboxyl;

R₁₅ is hydroxyl or amino;

(R₁₆)₀₋₃ is 0 to 3 identical or different radicals R₁₆ from the group consisting of sulfo, halogen, hydroxyl, $C_1$-$C_4$alkoxy and $C_1$-$C_4$alkyl;

(R₁₇)₀₋₂ is 0 to 2 identical or different radicals R₁₇ from the group consisting of $C_1$-$C_4$alkyl, $C_1$-$C_4$alkoxy, $C_1$–$C_4$alkoxy which is substituted in the alkyl part by hydroxyl, $C_1$–$C_4$alkoxy or sulfato, $C_2$–$C_4$alkanoylamino, ureido, halogen and sulfo;

$K_1$ independently is a radical of the formula (4a) - (4h) or (4j) - (4l) defined above;

$D_1$ is a phenyl or 1- or 2-naphthyl radical, which carries 1 to 3 identical or different radicals from the group consisting of sulfo, $C_1$–$C_4$alkyl, $C_1$–$C_4$alkoxy, halogen or a fibre-reactive radical of the formula (2a) or (2b);

D is the radical of a monoazo or disazo chromophore;

and X and Y are each as defined above.

The variables shown in the formulae (4a) to (4l) have the following preferred definitions:

$(R_4)_{0-3}$ is preferably 0 to 3 identical or different radicals $R_4$ from the group consisting of methyl, methoxy, ethoxy which is substituted in the alkyl part by hydroxyl, methoxy, ethoxy or sulfato, chlorine, hydroxyl, amino, N-mono- or N,N-di-$C_1$–$C_2$alkylamino, acetylamino, propionylamino, sulfo or a reactive radical of the formula (2c) defined above, in which X is halogen, $R_1$ is hydrogen and T is amino which is unsubstituted or substituted by non-reactive radicals, or morpholino;

$(R_4')_{0-2}$ is preferably 0 to 2 identical or different radicals $R_4'$ from the group consisting of methyl, methoxy, phenoxy, chlorine, sulfo and hydroxyl;

$R_5$ is hydrogen, methyl or ethyl;

$R_5'$ independently is as defined for $R_5$, or is acetyl, propionyl, 2-hydroxyethyl or 2-sulfatoethyl;

$R_6$ is preferably hydrogen;

$R_8$ is preferably hydrogen;

$R_9$ is preferably acetyl, propionyl, benzoyl or a fibre-reactive radical of the formula (2c) defined above;

$R_{10}$ is preferably carbamoyl or sulfomethyl;

$R10'$ is preferably cyano or carbamoyl;

$R_{11}$ is preferably methyl or ethyl;

$R_{12}$ is preferably hydrogen or $C_1$–$C_6$alkyl which is unsubstituted or substituted by hydroxyl, methoxy, ethoxy, sulfato or sulfo;

$R_{13}$ independently is preferably as defined for $R_{12}$, or is a radical of the formula (2c) defined above;

$R_{15}$ is preferably hydroxyl;

$(R_{16})_{0-3}$ is preferably 0 to 3 identical or different radicals from the group consisting of sulfo, methyl, methoxy, hydroxyl and chlorine;

$(R_{17})_{0-2}$ is preferably 0 to 2 identical or different radicals $R_{17}$ from the group consisting of methyl, methoxy, $C_1$–$C_2$alkoxy which is substituted in the alkyl part by hydroxyl or sulfato, acetylamino, propionylamino and sulfo;

$K_1$ is preferably a radical of the formula (4e) defined above;

$D_1$ is preferably a phenyl or 1- or 2-naphthyl radical, which carries 1 to 3 identical or different radicals from the group consisting of sulfo, methyl, methoxy, chlorine and a fibre-reactive radical of the formula (2a); and D is preferably the radical of a monoazo or disazo chromophor which contains diazo components and coupling components from the benzene or naphthalene series which are substituted by one or more substituents from the group consisting of sulfo, methyl, methoxy, chlorine, amino, hydroxyl, acetylamino, propionylamino, benzoylamino, ureido, 2-hydroxyethoxy, 2-sulfatoethoxy and a fibre-reactive radical of the formula (2c). Particularly preferably, D in formula (4l) is a radical of the formula

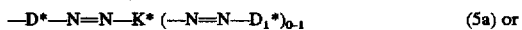  (5a) or

  (5b), in which

D* is a phenylene radical which is unsubstituted or substituted by sulfo, $D_1$* is phenyl or naphthyl which is unsubstituted or substituted by sulfo or a radical of the formula (2a) defined above, K* is the radical of a coupling component of the aminonaphtholsulfonic acid series, for example the radical of H-, K-, I- or γ-acid, which is unsubstituted or substituted on the amino group by acetyl, propionyl, benzoyl or a fibre-reactive radical of the formula (2c) defined above, and M is phenylene which is unsubstituted or substituted by sulfo, methyl, methoxy, acetylamino, ureido, 2-hydroxyethoxy or 2-sulfatoethoxy.

If s in formula (1) is the number 1, K is preferably a radical of the formula

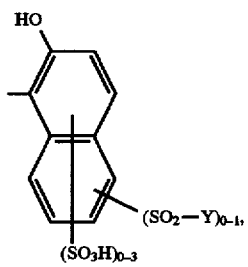 (4c')

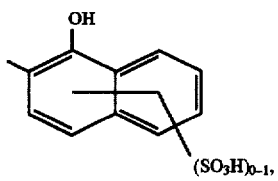 (4c")

-continued
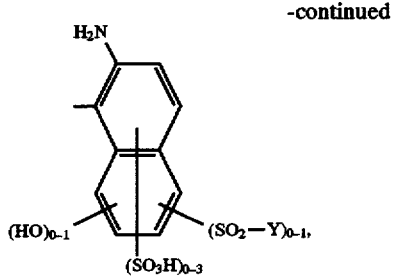 (4d')
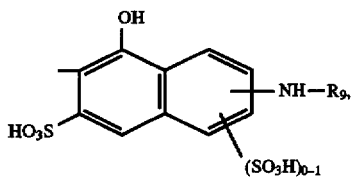 (4e')
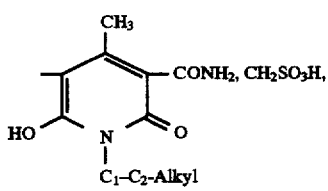 (4f')
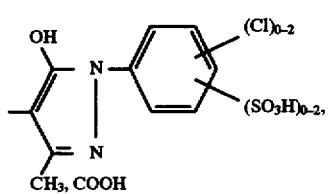 (4h')
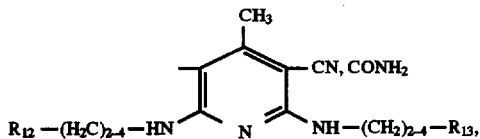 (4g')
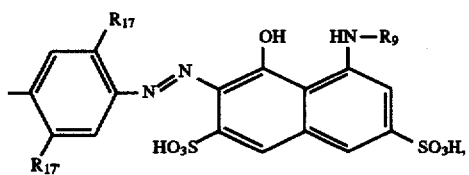 (4i')
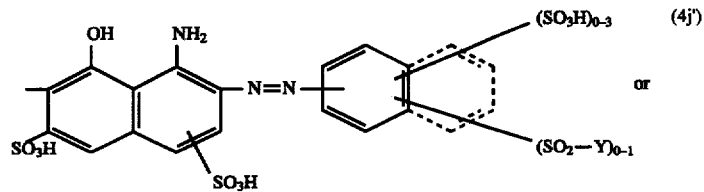 (4j')
or
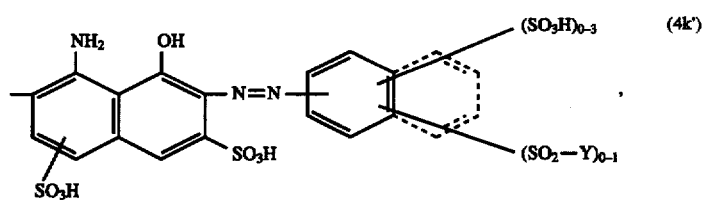 (4k')
in which
$R_9$ is acetyl, benzoyl or a radical of the formula (2c) defined above,
$R_{12}$ is hydrogen, hydroxyl or sulfato,
$R_{13}$ independently is as defined for $R_{12}$, or is a radical of the formula (2c) defined above, $R_{17}$ and $R_{17}'$ independently of one another are each hydrogen, methyl, methoxy, 2-hydroxyethoxy, 2-sulfatoethoxy, acetylamino, propionylamino, ureido or sulfo and Y is as defined and preferred above.

If s is the number 2, K is, for example, the radical of a coupling component of the aminonaphtholsulfonic acid series which can undergo coupling in two positions or a radical of the formula

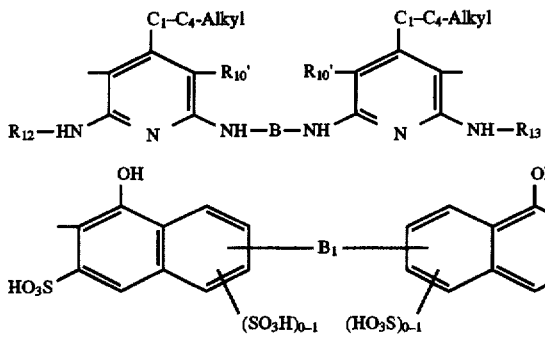

(6)

or

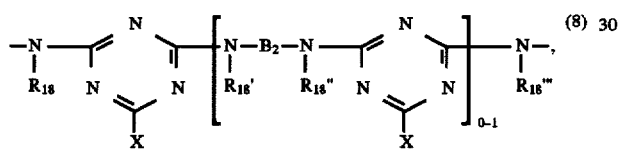

(7)

in which $B_1$ is a bridge member of the formula

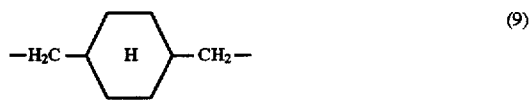

(8)

$R_{18}$, $R_{18}'$, $R_{18}''$ and $R_{18}'''$ independently of one another are each hydrogen or $C_1$-$C_4$alkyl which is unsubstituted or substituted, for example, by halogen, hydroxyl, cyano, $C_1$-$C_4$alkoxy, carboxyl, sulfo or sulfato, $B_2$ is an aliphatic, cycloaliphatic or aromatic bridge member and $R_{10}'$, $R_{12}$, $R_{13}$ and X are each as defined and preferred above.

Suitable coupling components of the aminonaphtholsulfonic acid series K which can undergo coupling in two positions are, for example, 1-amino-8-hydroxynaphthalene-3,6-disulfonic acid (H-acid) or 1-amino-8-hydroxynaphthalene-4,6-disulfonic acid (K-acid).

The alkylene radical B can be, for example, straight-chain or branched $C_2$-$C_{12}$alkylene which is uninterrupted or interrupted by —O—. B is preferably straight-chain or branched $C_2$-$C_6$alkylene which is unsubstituted or substituted by hydroxyl, sulfo or sulfato. Examples of particularly preferred alkylene radicals B are 1,2-ethylene, 1,2-propylene, 1,3-propylene, 2-hydroxy-1,3-propylene, 2-methyl-1,5-pentylene and 1,6-hexylene.

$R_{18}$, $R_{18}'$, $R_{18}''$ and $R_{18}'''$ in formula (8) independently of one another are each preferably hydrogen, methyl or ethyl, and particularly preferably each hydrogen.

An aliphatic bridge member $B_2$ here is as defined and preferred above for B.

A cycloaliphatic bridge member $B_2$ is here, for example, cyclohexylene or the radical of the formula

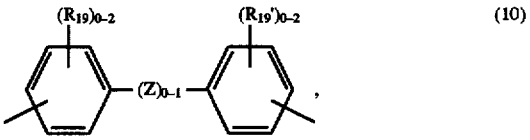

(9)

or —$NR_{18}'$ and —$NR_{18}''$ together with $B_2$ form a piperazine ring. Examples of aromatic bridge members $B_2$ are 1,2-, 1,3- or 1,4-phenylene which is unsubstituted or substituted, for example, by sulfo, methyl, methoxy or chlorine, naphthylene which is unsubstituted or substituted by sulfo, benzylene which is unsubstituted or substituted by sulfo, or a radical of the formula

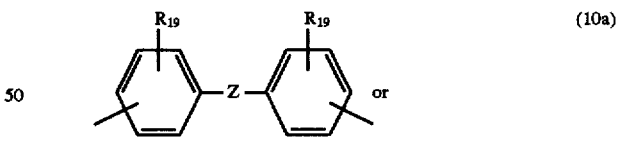

(10)

in which

Z is, for example, —CO—, —NHCO—, —NHCONH—, —$(CH_2)_{1-4}$—, —NH—, —CH=CH—, —O—, —$SO_2$— or —N=N— and $(R_{19})_{0-2}$ and $(R_{19}')_{0-2}$ independently of one another are each 0 to 2 identical or different radicals from the group consisting of sulfo, methyl, methoxy and chlorine.

Preferred aromatic bridge members B: are 1,3- or 1,4-phenylene which is unsubstituted or substituted by sulfo, methyl or methoxy, naphthylene which is substituted by 1 or 2 sulfo groups, or a radical of the formula

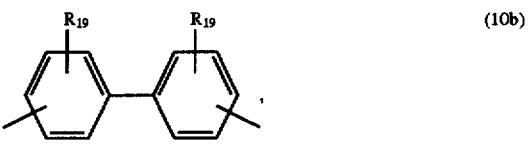

(10a)

or (10b)

in which

Z is —NHCONH—, —O—, —NH—, —CH=CH— or —$CH_2$— and $R_{19}$ is hydrogen or sulfo.

Examples of particularly preferred aromatic bridge members $B_2$ are 1,3-phenylene, 1,4-phenylene, 4-methylphenylene-1,3, 4-sulfo-1,3-phenylene, 3-sulfo-1,4-phenylene, 3,6-disulfo-1,4-phenylene, 4,6-disulfo-1,3-phenylene, 3,7-disulfo-1,5-naphthylene, 4,8-disulfo-2,6- naphthylene, 2,2'-disulfo-4,4'-diphenylene, 4,4'-phenyleneurea-2,2'-disulfonic acid and 2,2'-disulfo-4,4'-stilbenylene.
If s is the number 2, K is preferably a radical of the formula
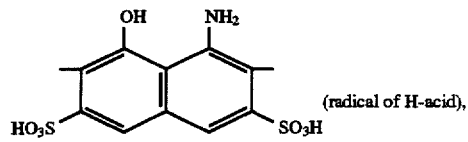 (radical of H-acid), (11a)
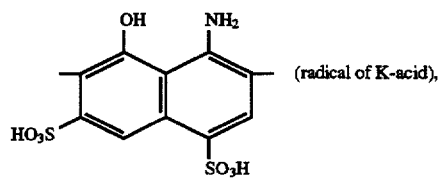 (radical of K-acid), (11b)
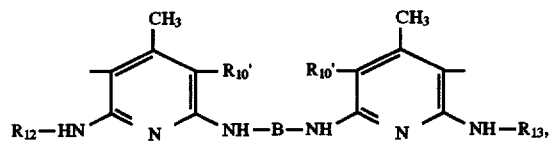 (6a)
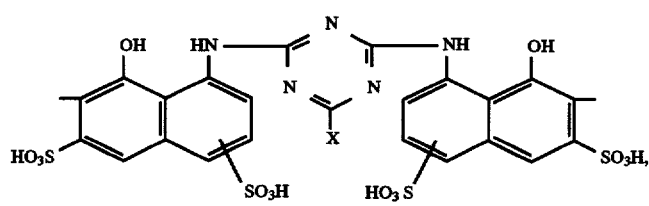 (7a)
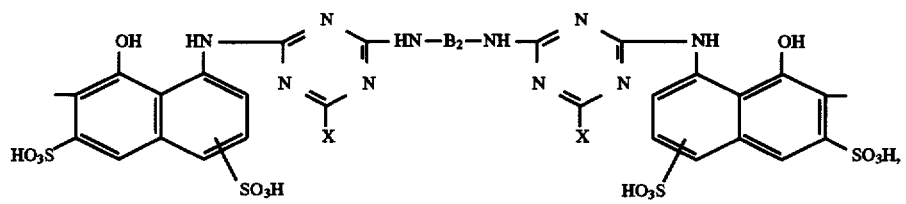 (7b)
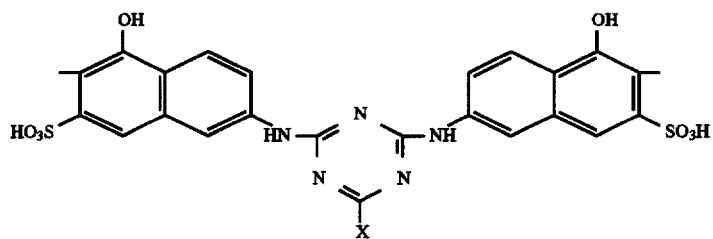 (7c)
or
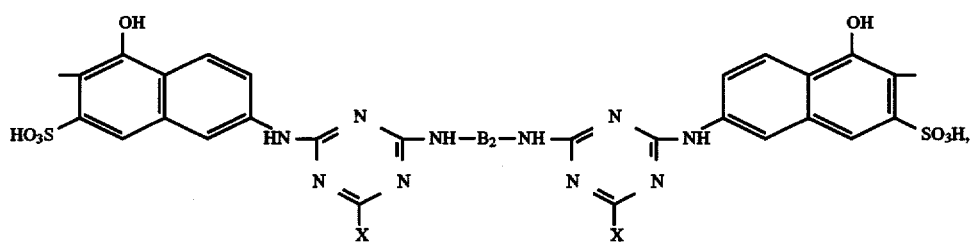 (7d)

in which $R_{10}'$ is cyano or carbamoyl, $R_{12}$ and $R_{13}$ independently of one another are each hydrogen or $C_1$-$C_6$alkyl which is unsubstituted or substituted by hydroxyl, methoxy, ethoxy, sulfato or sulfo, B is straight-chain or branched $C_2$-$C_6$alkylene, which is unsubstituted or substituted by hydroxyl, sulfo or sulfato, $B_2$ independently is as defined for B, or is 1,3- or 1,4-phenylene which is unsubstituted or substituted by sulfo, methyl or methoxy, naphthylene which is substituted by 1 or 2 sulfo groups, or a radical of the formula (10a) or (10b) defined above, and X is as defined and preferred above.

If s is the number 2, K is particularly preferably a radical of the formula (11a), (7a), (7b), (7c) or (7d) defined above, in which $B_2$ is straight-chain or branched $C_2$-$C_6$alkylene, which can be unsubstituted or substituted by hydroxyl, sulfo or sulfato, and X is chlorine or fluorine.

The compounds of the formula (1) can be obtained, for example, by diazotizing about s molar equivalents of the compound of the formula

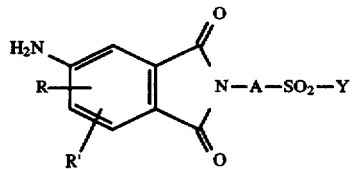

(12)

in the customary manner, for example with nitrites, such as sodium nitrite, in an acid, for example hydrochloric acid, medium and coupling the product to about 1 molar equivalent of a coupling component of the formula K—(H)$_s$ (13), in which A, K, R, R', Y and s are each as defined and preferred above.

The coupling of the diazotized compound of the formula (12) with the compound of the formula (13) advantageously takes place at a neutral to slightly acid pH, for example at pH 3 to 7, and preferably 5 to 6.5, and at temperatures of −5 to 30° C., and preferably 0 to 25° C.

The compounds of the formula (12) can be obtained, for example, by a) reacting phthalic anhydride with a compound of the formula

H$_2$N—A—S—CH$_2$—CH$_2$—U$_1$ (14)

to give the compound of the formula

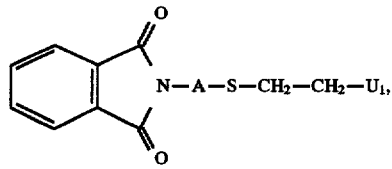

(15)

in which

A is in each case as defined and preferred above and

U$_1$ independently is as defined above for U or is hydroxyl, b) oxidizing the thioether compound of the formula (15) to give the corresponding sulfonyl compound of the formula

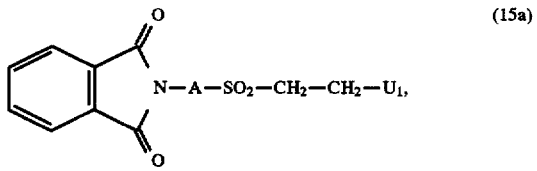

(15a)

c) selectively nitrating the resulting compound of the formula (15a) to give the compound of the formula

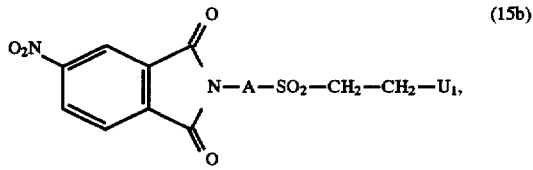

(15b)

d) reducing the resulting compound of the formula (15b) to give the amino compound of the formula

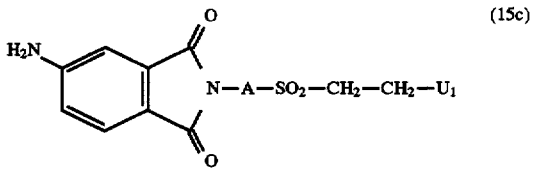

(15c)

and, if appropriate, during or after the synthesis of the compound of the formula (15a), (15b) or (15c), introducing one of the abovementioned radicals R and/or R' into the molecule or converting the radical U$_1$ into any radical U.

The condensation of phthalic anhydride with the amine of the formula (14) in step a) is carried out, for example, in an aqueous or aqueous-organic medium at a temperature of about 40° to 200° C., and preferably 50° to 150° C., under normal pressure, the water formed being distilled off.

The oxidation of the thioether compound of the formula (15) to give the sulfonyl compound of the formula (15a) in step b) can be carried out by various methods, for example with hydrogen peroxide with or without the addition of tungsten compounds or vanadium compounds as a catalyst, and furthermore with peracetic acid, potassium permanganate or chromic acid, or with chlorine/hydrochloric acid, in each case in an aqueous, aqueous-organic or organic medium.

The nitration of the compound of the formula (1 5a) to give the compound of the formula (15b) in step c) advantageously takes place in a mixture of concentrated sulfuric acid and concentrated nitric acid at room temperature or somewhat higher, for example at a temperature of 10° to 100° C., and preferably 30° to 50° C.

The reduction of the nitro compound of the formula (15b) to give the amino compound of the formula (15c) in step d) is carried out, for example, by catalytic hydrogenation with Pd/carbon in an aqueous, aqueous-organic or organic medium at room temperature up to about 60° C.; if the medium used for the hydrogenation comprises organic solvents, these are, in particular, alcohols, such as ethanol, and ethyl acetate or tetrahydrofuran. The hydrogenation mixture can also comprise a buffer, for example an acetic acid/acetate buffer. The reduction can also be carded out with Fe/hydrochloric acid or Fe/acetic acid in aqueous solution.

The compounds of the formula (15c) in which $U_1$ is hydroxyl can be convened into the corresponding compounds of the formula (12) in which Y is a radical —$CH_2$—$CH_2$—U by treatment with sulfating agents, phosphorylating agents, halogenating agents or alkyl- or arylcarboxylic acid halides, such as benzoyl chloride or acetyl chloride.

Suitable sulfating agents are, for example, concentrated sulfuric acid, and chlorosulfonic acid and amidosulfonic acid or other compounds which donate $SO_3$. The sulfation of the hydroxyl group $U_1$ to the sulfato group U can also be carried out in the course of the synthesis of the compounds of the formula (15c), for example in the nitrating step c). Halogenating agents which can be used are, for example, thionyl chloride or thionyl bromide. Suitable phosphorylating agents are, for example, concentrated phosphoric acid, pyro-, meta- or polyphosphoric acid, phosphoric acid alkyl esters, phosphorus oxytrichloride or mixtures of phosphoric acid and phosphorus(V) oxide.

If a radical R is introduced into the compound of the formula (15c), sulfonation or halogenation, i.e. the introduction of a sulfo or halogen group, for example, can be carried out, this taking place in a manner known per se, for example with concentrated sulfuric acid, oleum or chlorosulfonic acid or with chlorine or bromine in the presence of Lewis acids. The compounds of the formula (12) where R=sulfo or halogen can in turn be used as starting products for synthesis of the corresponding compounds where R=hydroxyl, $C_1$–$C_4$alkoxy or cyano, which can be carried out by customary methods described in textbooks on organic chemistry.

The coupling components of the formula (13) are known or can be obtained in a manner known per se.

The novel compounds of the formula (1) are fibre-reactive, i.e. they are capable of reacting with the hydroxyl groups of cellulose or with the reactive centres of natural and synthetic polyamides to form covalent chemical bonds. The present invention furthermore relates to mixtures of compounds comprising in each case a compound of the formula

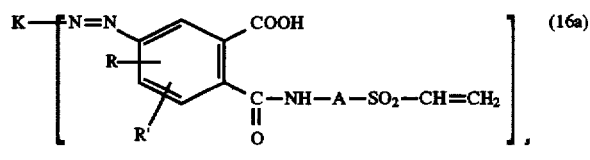

and

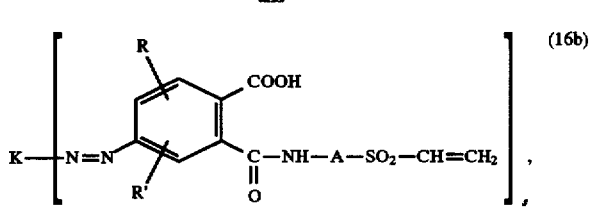

in which A, K, R, R' and s are each as defined and preferred above; the mixtures of compounds mentioned are likewise valuable novel fibre-reactive dyes for cellulose and polyamide fibre materials. The mixtures of compounds of the formula (16a) and (16b) can be obtained, for example, by simple treatment of the compounds of the formula (1) according to the invention in an aqueous alkaline medium; alternatively, a compound of the formula (12) can first be treated in an alkaline medium and the resulting mixture of compounds of the formula

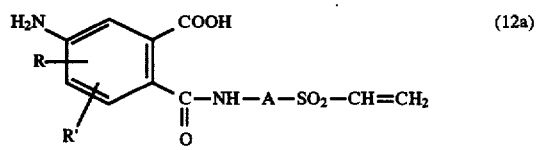

and

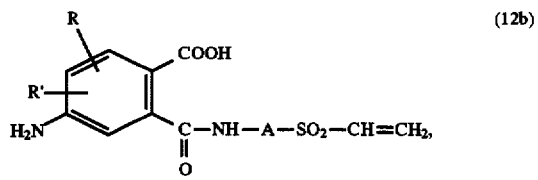

in which A, R and R' are each as defined and preferred above, can then be diazotized and the diazotization product coupled to a coupling component of the formula (13) defined above. The alkaline medium in each case has, for example, a pH of 8–14, and preferably 9–12, and can be prepared by means of customary bases, for example sodium hydroxide. On treatment of the compounds of the formula (1) or (12) in such an alkaline medium, ring opening occurs, the components of the formula (16a) and (16b) or, respectively, (12a) and (12b) in general being obtained in a stoichiometric ratio, i.e. in a ratio of about 1:1.

The reactive dyes of the formula (1) and (16a) and (16b) are suitable for dyeing and printing widely varying materials, in particular fibre materials containing hydroxyl groups or containing nitrogen. Examples are silk, leather, wool, polyamide fibres and polyurethanes, and, in particular, all types of cellulosic fibre materials. Such fibre materials are, for example, the natural cellulosic fibres, such as cotton, linen and hemp, as well as cellulose and regenerated cellulose. The reactive dyes of the formula (1) and (16a) and (16b) are also suitable for dyeing or printing fibres containing hydroxyl groups which are contained in blend fabrics, for example mixtures of cotton with polyester fibres or polyamide fibres.

The dyes according to the invention can be applied to the fibre material and fixed to fibre in various ways, in particular in the form of aqueous dye solutions and printing pastes. They are suitable both for the exhaust method and for dyeing by the padding method, can be employed at low dyeing temperatures and require only short steaming times in the pad-steam method. The degrees of fixing are high, and the non-fixed portions can easily be washed out, the difference between the degree of exhaustion and degree of fixing being remarkably low, i.e. the soaping loss is very low. The reactive dyes of the formula (1) and (16a) and (16b) are also suitable for printing, in particular on cotton, as well as for printing nitrogen-containing fibres, for example wool, silk or blend fabrics containing wool.

The dyeings and prints on cellulosic fibre materials produced with the dyes according to the invention have a high colour strength and a high fibre-dye bond stability both in the acid and in the alkaline range, and furthermore good light fastness properties and very good wet fastness properties, such as fastness to washing, water, sea water, cross-dyeing and perspiration, as well as a good fastness to pleating, fastness to ironing, fastness to rubbing and, in particular, fastness to chlorine.

The following examples serve to illustrate the invention. The temperatures are in degrees Celsius, parts are parts by weight and percentage data are % by weight, unless stated otherwise. Parts by weight bear the same relation to parts by volume as the kilogram to the liter.

Preparation of the compounds of the formula (12), (12a) and (12b)

Example 1: 148 parts of phthalic anhydride are introduced into a solution of 121 parts of 2-amino-2'-hydroxy-diethyl sulfide in 121 parts of water. During this operation, the temperature is allowed to rise to 50° C. After the introduction, the resulting suspension is heated under reflux and the water formed is distilled off under normal pressure. The temperature is then increased to 150° C. and the mixture is stirred at this temperature for a further hour. A melt of N-(2-(2-hydroxyethylthio)ethyl)phthalimide of the formula

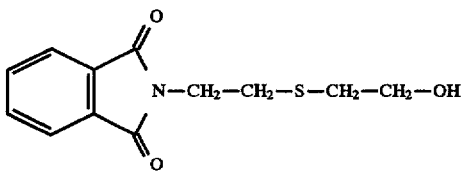

is obtained.

The resulting melt is cooled to 80° C. and 8 parts of sodium acetate and 0.5 part of tungsten(VI) oxide are then added. 214 parts of 35% hydrogen peroxide are now added dropwise at a temperature of 75°–80° C. in the course of 2 hours, and the mixture is subsequently stirred at 80° C. with a slight excess of peroxide for a further 2 hours, until sulfoxide is no longer detectable by HPLC. To precipitate the emulsion formed, the hot reaction mass is poured onto 500 parts of cold water and filtered and the residue is washed free from peroxide with water. After drying in vacuo at 60° C., 253 parts of N-(2-(2-hydroxyethylsulfonyl)ethyl) phthalimide of the formula

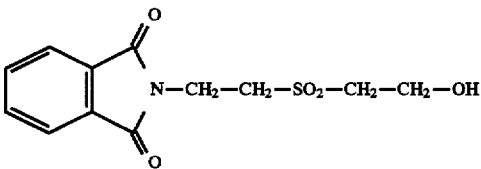

are obtained with a melting point of 120°–122° C. and a purity (HPLC) of 99%. $^1$H-NMR analysis (measured in DMSO-$d_6$ with TMS as standard): 3.30 ppm (2 H;t), 3.50 ppm (2 H;t), 3.79 ppm (2 H;q), 4.05 ppm (2 H;t), 5.17 ppm (1 H;t), 7.8–7.9 ppm (4 H).

Example 2: 253 parts of N-(2-(2-hydroxyethylsulfonyl) ethyl)phthalimide are introduced into 735 parts of 100% sulfuric acid at 20°–30° C., while stirring. The mixture is subsequently stirred at room temperature for one hour until the solution is complete. 113 parts of 50% mixed acid are now added dropwise at a temperature of 10°–15° C. in the course of 3 hours. Thereafter, the mixture is heated to 40° C. and subsequently stirred at this temperature for a further 12 hours. For isolation, the nitration mixture is poured onto 2500 parts of ice at a maximum of 5° C. 250 parts of potassium sulfate are added to the clear solution and the mixture is stirred at 10° C. for one hour. The product which has precipitated out is filtered off and washed with 10% potassium sulfate solution. 1195 parts of moist 4-nitro-N-(2-(2-sulfatoethylsulfonyl)ethyl)phthalimide of the formula

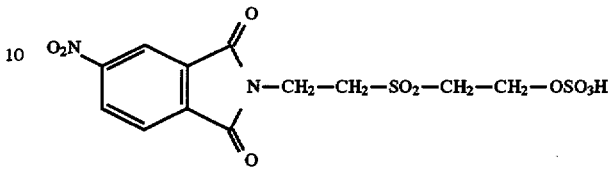

are obtained. $^1$H-NMR analysis (measured in DMSO-$d_6$ with TMS as standard): 3.45 ppm (2 H, t); 3.50 ppm (2 H, t); 4.05 ppm (2 H, t); 4.10 ppm (2 H, t); 8.16 ppm (1 H, d); 8.52 ppm (1 H, s); 8.63 ppm (1 H, d).

Example 3: 1195 parts of moist 4-nitro-N-(2-(2-sulfatoethylsulfonyl)ethyl)phthalimide are dissolved in 2500 parts of water, 10 parts of sodium acetate and 8 parts of acetic acid. This solution is hydrogenated under normal pressure at 50° C. with hydrogen, with the addition of 30 parts of 5% palladium-charcoal, until the reaction stops. After the catalyst has been filtered off, 700 parts of potassium chloride are added to the resulting solution and the product which has precipitated out is filtered off with suction. After drying in vacuo at 50° C., 150 parts of 78% (nitrite titre) 4-amino-N-(2-(2-sulfatoethylsulfonyl)ethyl) phthalimide of the formula

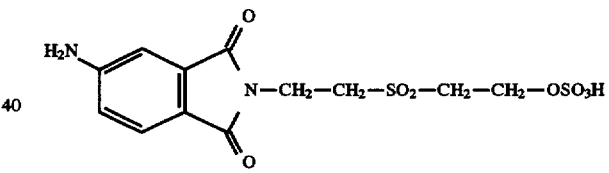

are obtained with a purity of 96% (HPLC). $^1$H-NMR analysis (measured in DMSO-$d_6$ with TMS as standard): 3.42 ppm (2 H;t), 3.48 ppm (2 H;t), 3.94 ppm (2 H;t), 4.07 ppm (2 H;t), 6.45 ppm (2 H;s), 6.80 ppm (1 H;q) $^3$J=7 Hz and $^4$J=2 Hz, 6.93 ppm (1 H;d) $^4$J=2 Hz, 7.48 ppm (1 H,d) $^3$J=7 Hz.

Examples 4–6a: The following compounds can be prepared in a manner analogous to that described in Examples 1–3:

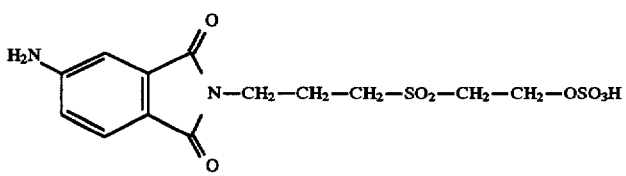

4

-continued

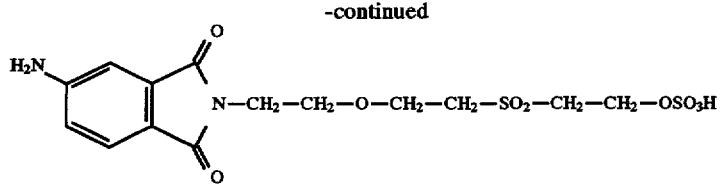

5

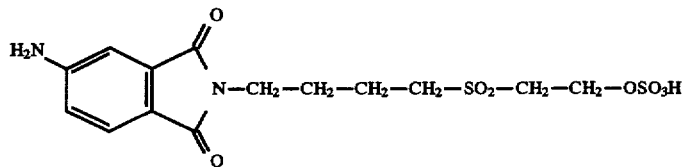

6

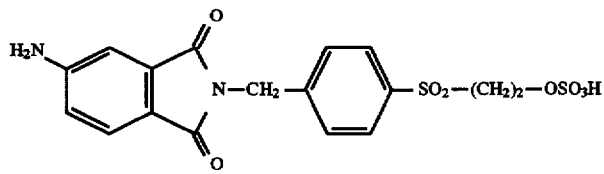

6a

Examples 7–10a: If the compounds obtained according to Examples 3 to 6a are treated for about 1 hour in an aqueous solution, the pH of which is brought to about 10 by addition of sodium hydroxide solution, and the pH is then lowered to 6 with acetic acid, an approximately stoichiometric mixture of two compounds of the formula shown in the table, in which the amino group is in the 4-position in one case and in the 5-position in one case, is obtained.

is then heated at 130° C. for about 3 hours and subsequently allowed to cool to room temperature, and the cooled reaction mass is poured onto 500 parts of ice. The excess sulfuric acid is precipitated with calcium carbonate and the pH of the filtrate resulting after the $CaSO_4$ has been filtered off is brought to a value of 4 with sodium carbonate. Evaporation or freeze-drying gives the compound of the formula

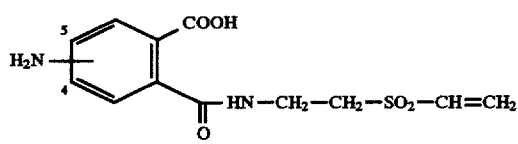

7

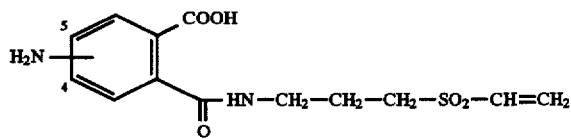

8

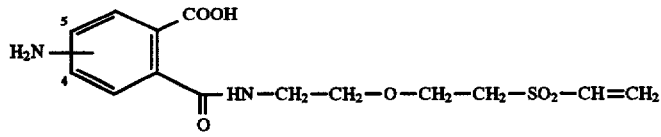

9

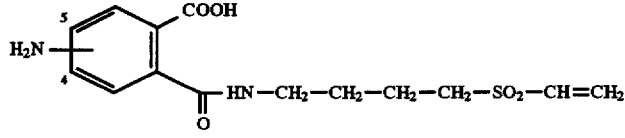

10

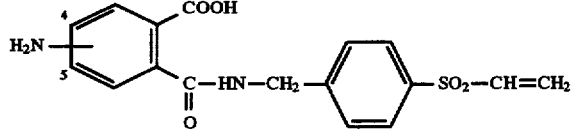

10a

Example 11: 32 parts of 65% oleum are added dropwise to 215 parts of 100% sulfuric acid at 20° to 30° C. Thereafter, 37.8 parts of the compound according to Example 3 are introduced in the course of 30 minutes, during which the temperature is allowed to rise to 60° C. The sulfonation mass

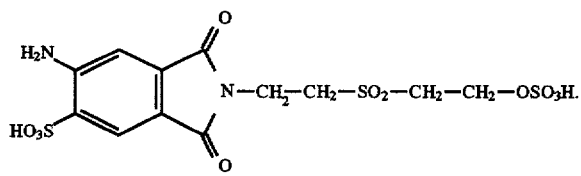

¹H-NMR analysis (measured in DMSO-d₆ with TMS as standard): 3.45 ppm (2 H;t), 3.52 ppm (2 H;t), 4.03 ppm (2 H;t), 4.09 ppm (2 H;t), 7.03 ppm (1 H;s), 7.80 ppm (1 H;s).

1-benzoylamino-8-hydroxynaphthalene-3,6-disulfonic acid suspended in 200 parts of water at pH 6. During this operation, the pH is maintained by addition of sodium carbonate solution. After the addition, the mixture is subsequently stirred at pH 5.5 for a further 2 hours until coupling is complete, during which the temperature is allowed to rise to room temperature. The dye solution is then subjected to reverse osmosis and freeze-dried. A dye which, in the form of the free acid, is the compound of the formula

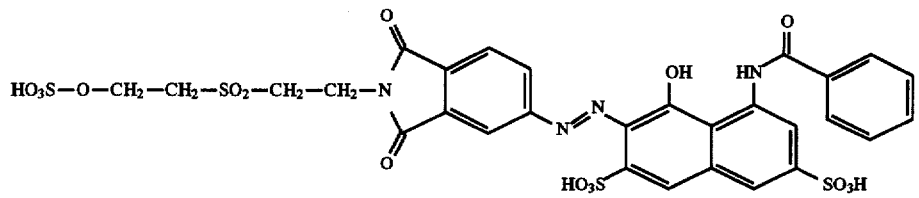

Example 12: If the compound obtained according to Example 11 is treated in an alkaline medium, an approximately stoichiometric mixture of two compounds of the formula and dyes cotton and wool in brilliant red shades with good all round fastness properties is obtained.

Example 14: If the procedure is as in Example 13 and the pH of the reaction mixture is brought to pH 10 with 4N sodium hydroxide solution before the reverse osmosis, the mixture is stirred at this pH for one hour and the pH is then brought to pH 6 again with a little acetic acid, a dye which, in the form of the free acid, is the isomer mixture in the ratio 1:1 of the formula

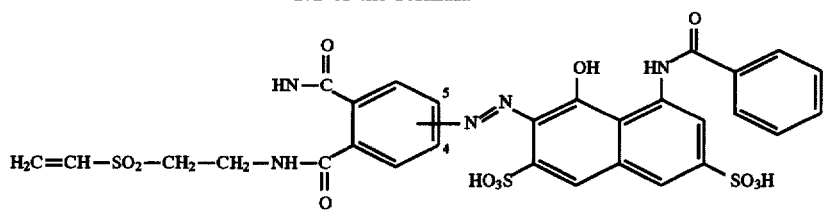

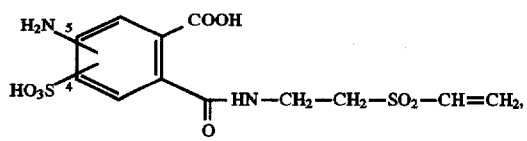

in which one compound contains the amino group in the 4-position and the sulfo group in the 5-position and the other compound contains the amino group in the 5-position and the sulfo group in the 4-position, is obtained.

Preparation of the dyes of the formula (1) and (16a) and (16b)

Example 13: 37.8 parts of the compound according to Example 3 in 250 parts of an ice-water suspension are acidified with 25 parts by volume of 32% aqueous hydrochloric acid and diazotized with 25 parts by volume of 4N sodium nitrite solution. The mixture is subsequently stirred at a temperature of 5° C. for one hour and the excess nitrous acid is then destroyed with amidosulfonic acid.

This diazonium suspension is allowed to run slowly at 0°–5° C. and a pH of 4.5–5.5 into a suspension comprising is obtained. Reverse osmosis and subsequent freeze-drying give a dye which, when used for dyeing cotton or wool, has the same properties as the dye in Example 13.

Example 15: 37.8 parts of 4-amino-N-(2-(2-sulfatoethylsulfonyl)ethyl)phthalimide according to Example 3 in 250 parts of an ice-water suspension are acidified with 25 parts by volume of 32% aqueous hydrochloric acid and diazotized with 25 parts by volume of 4N sodium nitrite solution. The mixture is subsequently stirred at a temperature of 5° C. for one hour and the excess nitrous acid is then destroyed with amidosulfonic acid. A neutral solution, prepared with 10% sodium carbonate solution, of 16 parts of 1-amino-8-hydroxynaphthalene-3,6-disulfonic acid in 100 parts of water is allowed to run into this diazo suspension in the course of 30 minutes. The mixture is stirred at 0°–5° C. for 3 hours, the pH is then brought to pH 6.0 with 10% sodium carbonate solution in the course of one hour, the temperature is allowed to rise to room temperature and the mixture is subsequently stirred at pH 6 for a further 2 hours. The dark blue solution formed is subjected to reverse osmosis and freeze-dried. A dye which, in the form of the free acid, is the compound of the formula

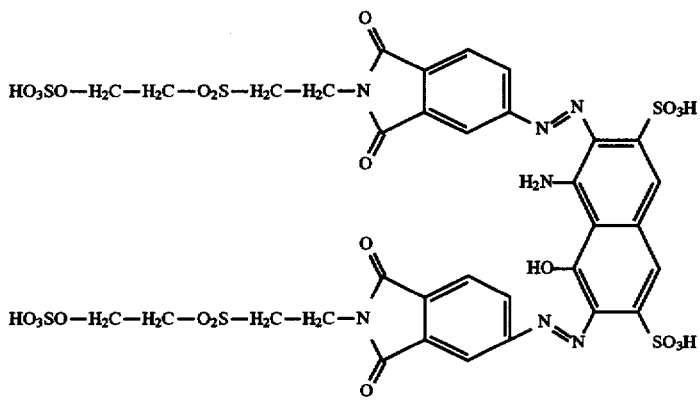

and dyes cotton and wool in navy blue shades with good all round fastness properties is obtained.

Example 16: If the dye solution obtained according to Example 15 is treated in an alkaline medium as described in Example 14, after reverse osmosis and freeze-drying a dye which, in the form of the free acid, is the isomer mixture in the ratio 1:1:1:1 of the formula

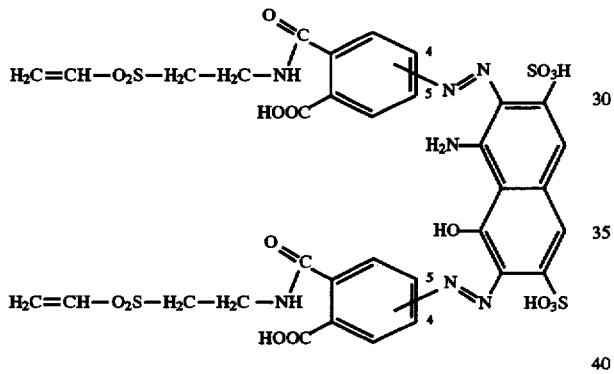

and dyes cotton and wool in navy blue shades with good all round fastness properties is obtained.

Example 17: A solution, brought to pH 6 with 10% sodium carbonate solution, of 31.9 parts of 1-amino-8-hydroxynaphthalene-3,6-disulfonic acid in 100 parts of water is allowed to run into an ice-cold dispersion of 9.3 parts of cyanuric chloride, 0.05 part of a wetting agent, 0.1 part of disodium hydrogen phosphate and 100 parts of ice-water in the course of one hour, while stirring intensively, and the mixture is subsequently stirred at 0°–5° C. for one hour. Thereafter, the temperature is allowed to rise to room temperature, the pH is increased slowly to pH 6 at the same time with 10% sodium carbonate solution and the mixture is subsequently stirred for one hour. A coupling component which, in the form of the free acid, has the formula

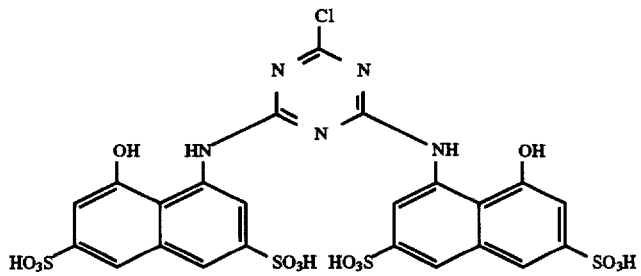

is obtained. The diazo suspension prepared according to Example 13, 1st paragraph is allowed to run into this suspension at 0°–5° C., during which the pH is maintained at pH 6.0–6.5 with 10% sodium carbonate solution. The mixture is subsequently stirred at 0°–5° C. for one hour and at room temperature and a pH of 6.5 for a further 2 hours. When the coupling is complete, the red solution is subjected to reverse osmosis and freeze-dried. A dye which, in the form of the free acid, has the formula

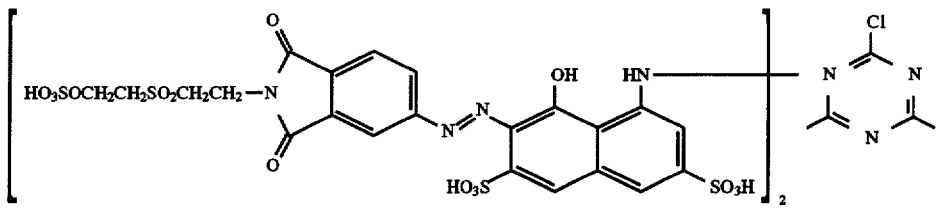

and dyes cotton and wool in brilliant red shades with good all round fastness properties is obtained.

Example 18: If the dye solution obtained according to Example 17 is treated in an alkaline medium as described in Example 14, after reverse osmosis and freeze-drying a dye which, in the form of the free acid, is the isomer mixture in the ratio 1:2:1 of the formula

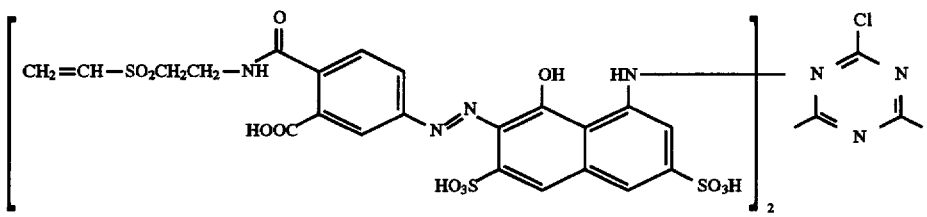

is obtained. It has similar properties to the dye described in Example 17.

Examples 19–35: If the diazo component of the formula

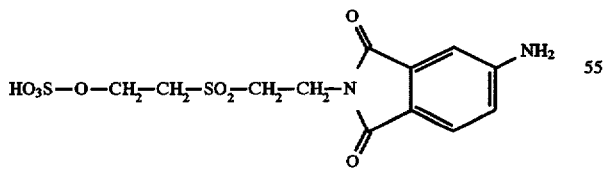

is reacted analogously to the description in Examples 13, 15 or 17 with the coupling components shown in the following table, analogous dyes are obtained; the arrows positioned on the coupling components here mark the coupling position or coupling positions:

TABLE
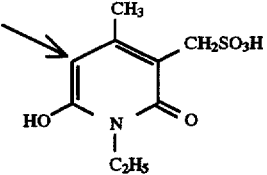
19
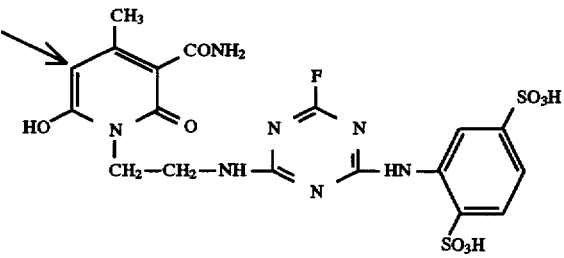
20
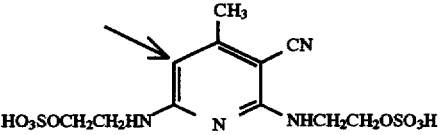
21
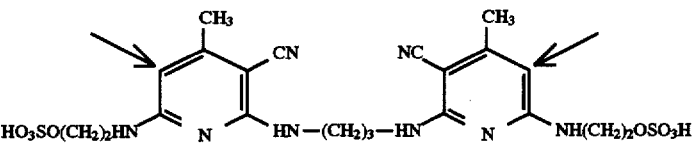
22
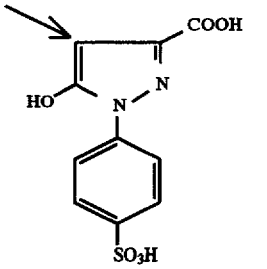
23
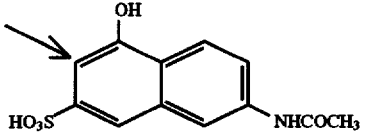
24
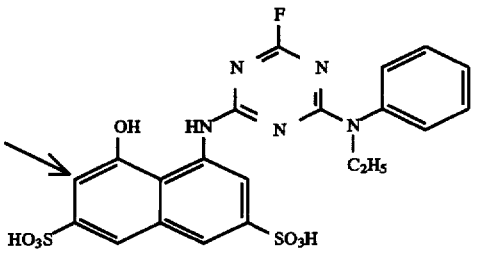
25

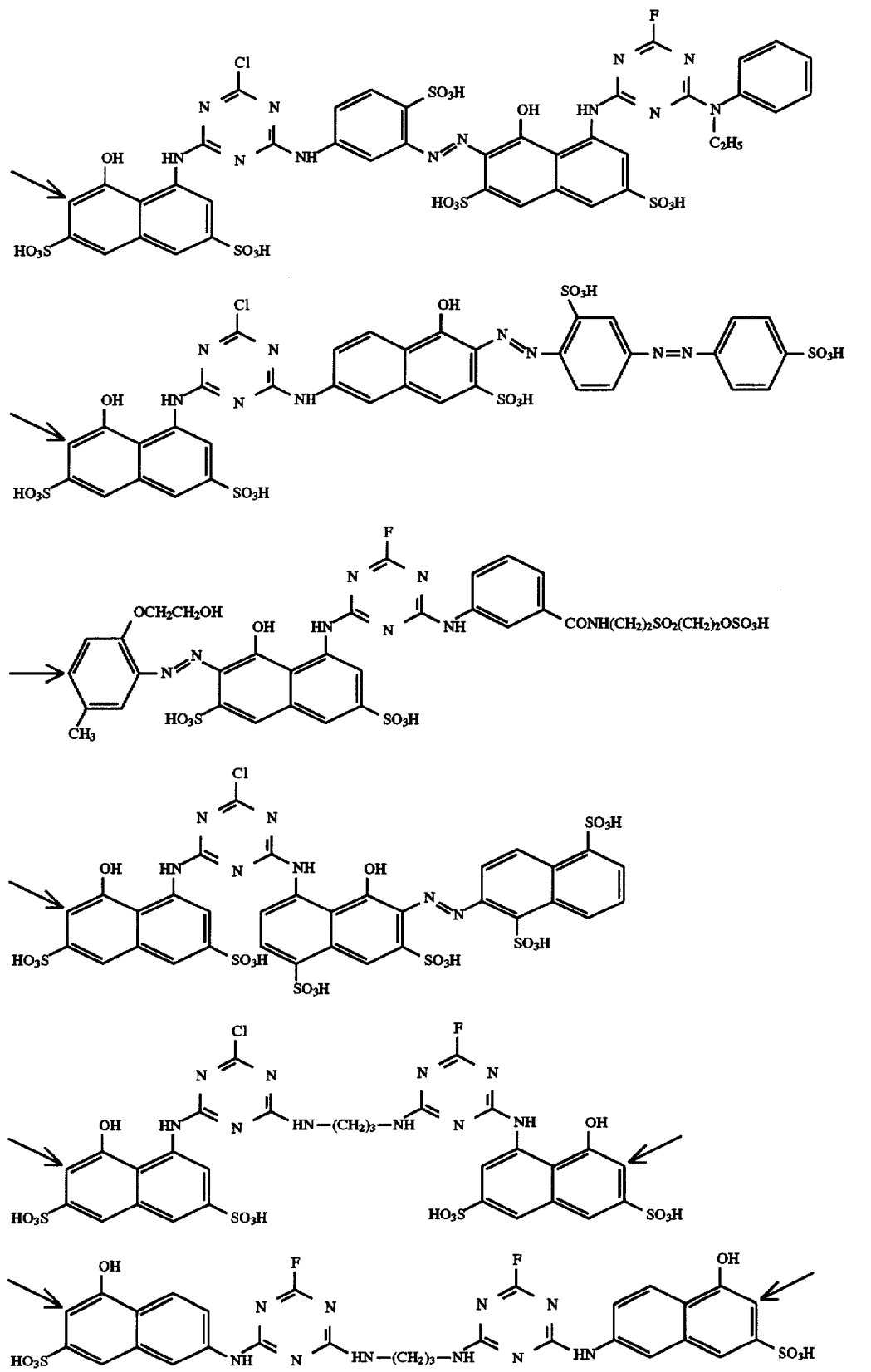

TABLE-continued
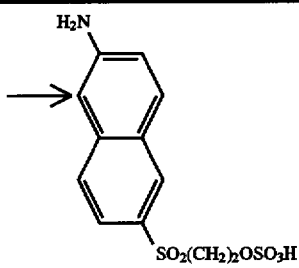
32
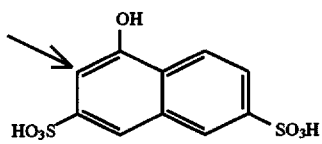
33
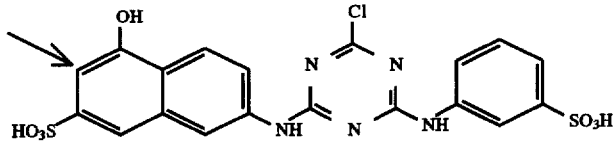
34
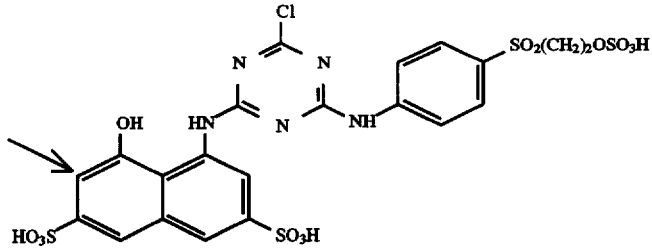
35
Examples 36–40: If the procedure is as described in Examples 13 to 35 and instead of the diazo component according to Example 3, the equivalent amount of the following diazo components is used, analogous dyes with similarly good all round fastness properties are obtained:
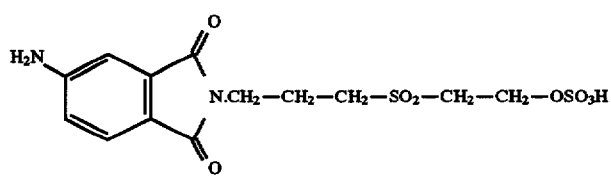
36
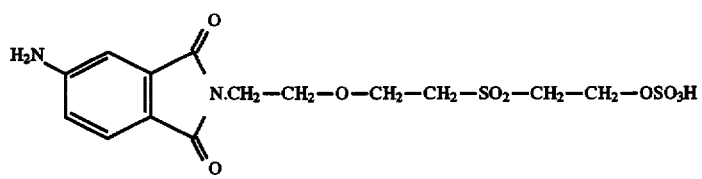
37
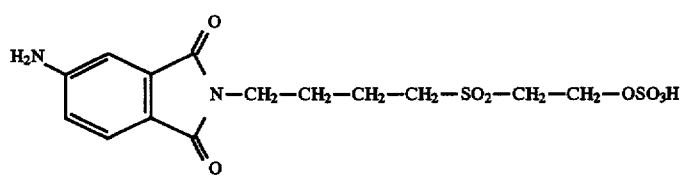
38

-continued

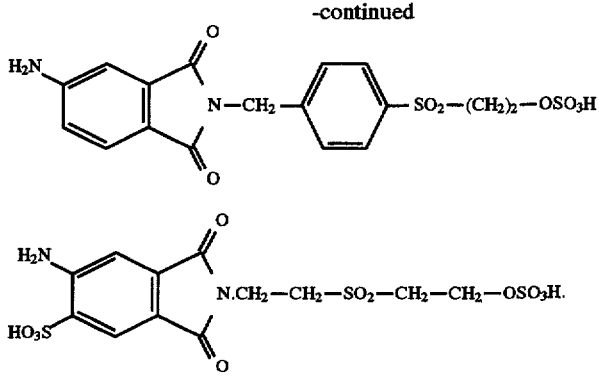

39

40

Dyeing instructions I 2 parts of the dye obtained according to Example 13 are dissolved in 400 parts of water; 1500 parts of a solution which comprises 53 g of sodium chloride per liter are added thereto. 100 parts of cotton fabric are introduced into this dyebath at 40° C. After 45 minutes, 100 parts of a solution which comprises 16 g of sodium hydroxide and 20 g of calcined sodium carbonate per liter are added. The temperature of the dyebath is kept at 40° C. for a further 45 minutes. Thereafter, the dyed goods are rinsed, soaped at the boil with a nonionic detergent for a quarter of an hour, rinsed again and dried.

Dyeing instructions II 2 parts of the reactive dye obtained according to Example 13 are dissolved in 400 parts of water; 1500 parts of a solution which comprises 53 g of sodium chloride per liter are added thereto. 100 parts of a cotton fabric are introduced into this dyebath at 35° C. After 20 minutes, 100 parts of a solution which comprises 16 g of sodium hydroxide and 20 g of calcined sodium carbonate per liter are added. The temperature of the dyebath is kept at 35° C. for a further 15 minutes. Thereafter, the temperature is increased to 60° C. in the course of 20 minutes. The temperature is kept at 60° C. for a further 35 minutes. Thereafter, the goods are rinsed, soaped at the boil with a nonionic detergent for a quarter of an hour, rinsed again and dried.

Dyeing instructions III 8 parts of the reactive dye obtained according to Example 13 are dissolved in 400 parts of water;, 1400 parts of a solution which comprises 100 g of sodium sulfate per liter are added thereto. 100 parts of a cotton fabric are introduced into this dyebath at 25° C. After 10 minutes, 200 parts of a solution which comprises 150 g of trisodium phosphate per liter are added. Thereafter, the temperature of the dyebath is increased to 60° C. in the course of 10 minutes. The temperature is kept at 60° C. for a further 90 minutes. Thereafter, the goods are rinsed, soaped at the boil with a nonionic detergent for a quarter of an hour, rinsed again and dried.

Dyeing instructions IV 4 parts of the reactive dye obtained according to Example 13 are dissolved in 50 parts of water. 50 parts of a solution which comprises 5 g of sodium hydroxide and 20 g of calcined sodium carbonate per liter are added thereto. A cotton fabric is padded with the resulting solution such that it increases by 70% of its weight, and is then wound up into a fabric roll. The cotton fabric is kept at room temperature for 3 hours in this manner. Thereafter, the dyed goods are rinsed, soaped at the boil with a nonionic detergent for a quarter of an hour, rinsed again and dried.

Dyeing instructions V 6 parts of the reactive dye obtained according to Example 13 are dissolved in 50 parts of water. 50 parts of a solution which comprises 16 g of sodium hydroxide and 0.04 liter of waterglass (38°bé) per liter are added thereto. A cotton fabric is padded with the resulting solution such that it increases by 70% of its weight, and is then wound up into a fabric roll. The cotton fabric is kept at room temperature for 10 hours in this manner. Thereafter, the dyed goods are rinsed, soaped at the boil with a nonionic detergent for a quarter of an hour, rinsed again and dried.

Dyeing instructions VI 2 parts of the reactive dye obtained according to Example 13 are dissolved in 100 parts of water with the addition of 0.5 part of sodium m-nitrobenzenesulfonate. A cotton fabric is impregnated with the resulting solution such that it increases by 75% of its weight, and is then dried. The fabric is then impregnated with a solution, warmed to 20° C., which comprises 4 g of sodium hydroxide and 300 g of sodium chloride per liter, and squeezed off to a weight increase of 75%, and the dyeing is steamed at 100° to 102° C. for 30 seconds, rinsed, soaped in a 0.3% boiling solution of a nonionic detergent for a quarter of an hour, rinsed and dried.

Dyeing instructions VII 0.1 part of dye according to Example 13 are dissolved in 200 parts of demineralized water, and 0.5 part of sodium sulfate decahydrate, 0.1 part of a levelling agent and 0.5 part of sodium acetate are added. The pH is then brought to 5.5 with 80% acetic acid. The dyebath is heated at 50° C. for 10 minutes and 10 parts of a woolen fabric are then added. The bath is heated to 100° C. in the course of about 50 minutes and dyeing is carded out at this temperature for 60 minutes. Thereafter, the bath is allowed to cool to 90° C. and the dyed goods are removed. The woolen fabric is rinsed with hot and cold water and then spun-dried and dried. A brilliant red dyeing which has very good light fastness and wet fastness properties is obtained.

Printing instructions I 3 parts of the reactive dye obtained according to Example 13 are sprinkled into 100 parts of a stock thickener comprising 50 parts of 5% sodium alginate thickener, 27.8 parts of water, 20 parts of urea, 1 part of sodium m-nitrobenzenesulfonate and 1.2 parts of sodium bicarbonate, while stirring rapidly. A cotton fabric is printed with the printing paste thus obtained, and the resulting printed material is dried and steamed in saturated steam at 102° C. for 2 minutes. The printed fabric is then rinsed, soaped at the boil, if appropriate, and rinsed again, and then dried.

Printing instructions II 5 parts of the reactive dye obtained according to Example 13 are sprinkled into 100 parts of a stock thickener comprising 50 parts of 5% sodium alginate thickener, 36.5 parts of water, 10 parts of urea, 1 part of sodium m-nitrobenzenesulfonate and 2.5 parts of sodium bicarbonate, while stirring rapidly. A cotton fabric is printed with the printing paste thus obtained, the stability of which meets technical requirements, and the resulting printed material is dried and steamed in saturated steam at 102° C. for 8 minutes. The printed fabric is then rinsed, soaped at the boil, if appropriate, and rinsed again, and then dried.

What is claimed is:

1. A mixture of compounds comprising a compound of the formula

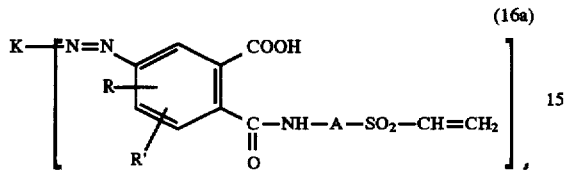

and a compound of the formula

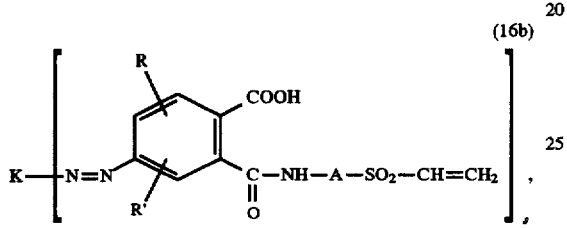

in which

K is the radical of a coupling component, s in the compounds of formulae (16a) and (16b) has identical meanings and is the number 1 or 2, R and R' independently of one another are each hydrogen, sulfo, hydroxyl, $C_1$–$C_4$alkoxy, halogen or cyano, A is $C_1$–$C_6$alkylene which is unsubstituted or substituted by halogen, hydroxyl, sulfato, carboxyl, cyano, $C_2$–$C_4$alkanoyloxy, $C_1$–$C_4$alkoxycarbonyl or carbamoyl or interrupted by a group —O— or —NR"—, or is $C_1$–$C_6$alkylenephenylene which is unsubstituted or substituted in the phenyl part by $C_1$–$C_4$alkyl, $C_1$–$C_4$alkoxy, halogen or sulfo, R" is hydrogen or $C_1$–$C_4$alkyl, and the ratio of the compounds of formulae (16a) and (16b) is about 1:1.

2. A mixture according to claim 1, in which
R is hydrogen, sulfo, chlorine, bromine or cyano and R' is hydrogen.

3. A mixture according to claim 1, in which
A is 1,2-ethylene, 1,3-propylene, 1,4-butylene or a radical of the formula

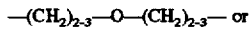

4. A mixture according to claim 1, in which
K is the radical of a coupling component of the benzene, naphthalene, naphthylazobenzene, phenylazonaphthalene, 4-alkyl-6-hydroxy-2-pyridone, 2,5-diamino-4-alkylpyridine, 1-aryl-5-pyrazolone or 1-aryl-5-aminopyrazole series.

5. A mixture according to claim 1, in which
K carries one or more identical or different substituents selected from the group consisting of $C_1$–$C_{12}$alkyl, $C_1$–$C_8$alkoxy, $C_1$–$C_4$alkoxy which is substituted in the alkyl part by hydroxyl, $C_1$–$C_4$alkoxy or sulfato; $C_2$–$C_8$acylamino, amino, N-mono- or N,N-di-$C_1$–$C_4$alkylamino which is unsubstituted or substituted in the alkyl part by hydroxyl, sulfo, sulfato or $C_1$–$C_4$alkoxy; phenylamino which is unsubstituted or substituted in the phenyl part by methyl, methoxy, halogen or sulfo; N—$C_1$–$C_4$alkyl-N-phenylamino which is unsubstituted or substituted in the alkyl part by hydroxyl, sulfo or sulfato or unsubstituted or substituted in the phenyl part by methyl, methoxy, halogen or sulfo; naphthylamino which is unsubstituted or substituted by sulfo, $C_2$–$C_8$alkanoyl, benzoyl, $C_1$–$C_4$alkoxycarbonyl, $C_1$–$C_4$alkylsulfonyl, phenyl- or naphthylsulfonyl; trifluoromethyl, nitro, cyano, hydroxyl, halogen, carbamoyl, N—$C_1$–$C_4$alkylcarbamoyl, sulfamoyl, N—$C_1$–$C_4$alkylsulfamoyl, N-(β-hydroxyethyl)-sulfamoyl, N,N-di-(β-hydroxyethyl)-sulfamoyl, N-phenylsulfamoyl, ureido, carboxyl, sulfomethyl, sulfo or sulfato and a fibre-reactive radical of the formula

  (2a),

  (2b) or

  (2c)

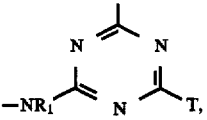

in which

X is halogen, 3-carboxypyridin-1-yl or 3-carbamoylpyridin-1-yl,

T independently is as defined for X or is hydroxyl, $C_1$–$C_4$alkoxy, phenoxy, $C_1$–$C_4$alkylthio, morpholino, amino which is unsubstituted or substituted by non-reactive radicals, or a reactive radical of the formula

  (3a)

(3b)

(3c)

  (3d)

  (3e)

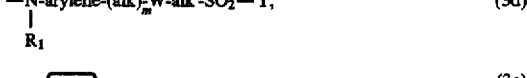

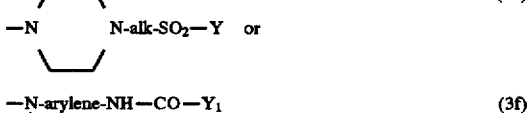  (3f)

$R_1$ is hydrogen or $C_1$–$C_4$alkyl, $R_2$ is hydrogen, $C_1$–$C_4$alkyl which is unsubstituted or substituted by hydroxyl, sulfo, sulfato, carboxyl or cyano, or a radical $$-alk-SO_2-Y,\quad \overset{R_3}{|}$$

$R_3$ is hydrogen, hydroxyl, sulfo, sulfato, carboxyl, cyano, halogen, $C_1$-$C_4$alkoxycarbonyl, $C_1$-$C_4$alkanoyloxy, carbamoyl or the group —$SO_2$—Y, alk and alk' independently of one another are $C_1$-$C_6$alkylene, arylene is a phenylene or naphthylene radical which is unsubstituted or substituted by sulfo, carboxyl, $C_1$-$C_4$alkyl, $C_1$-$C_4$alkoxy or halogen, $Y_1$ is a group —$CHX_2$—$CH_2X_2$ or —$CX_2$=$CH_2$ and $X_2$ is chlorine or bromine, Q is a radical —O— or —NR"—, in which R" is as defined in claim 1.

W is a group —$SO_2$—$NR_2$—, —$CONR_2$— or —$NR_2CO$—, m is the number 0 or 1, n is an integer from 1 to 6, Y is vinyl or a radical —$CH_2$—$CH_2$—U, and U is a leaving group which can be split off under alkaline conditions.

6. A mixture according to claim 5, in which s is the number 1 and

K is a radical of the formula (4a) [structure: phenyl with $(R_4)_{0-3}$ and $NR_5R'_5$]

(4b) [structure: phenyl with $(R_4')_{0-2}$ and $O-R_6$]

(4c) [structure: naphthyl with HO, $(SO_3H)_{0-3}$, $(SO_2-Y)_{0-1}$]

(4d) [structure: naphthyl with $H_2N$, $(SO_3H)_{0-3}$, $(R_7)_{0-2}$]

(4e) [structure: naphthyl with OH, $HO_3S$, $NR_8R_9$, $(SO_3H)_{0-1}$]

(4f) [structure: pyridone with $CH_3$, HO, $R_{10}$, $R_{11}$]

(4g) [structure: pyridine with $C_1$-$C_4$-Alkyl, $R_{10}'$, $R_{12}$—HN, NH—$R_{13}$]

(4h) [structure with $R_{15}$, $R_{14}$, $(R_{16})_{0-3}$]

(4i) [structure: aryl with $(R_{17})_{0-2}$, N=N—$K_1$]

(4j) [structure: naphthyl with OH, $NH_2$, N=N—$D_1$, $HO_3S$, $SO_3H$]

(4k) [structure: naphthyl with $NH_2$, OH, N=N—$D_1$, $SO_3H$, $SO_3H$]

or (4l) [structure: naphthyl with OH, HN—, HN—D, N, N, X, $SO_3H$, $SO_3H$]

in which $(R_4)_{0-3}$ is 0 to 3 identical or different radicals $R_4$ selected from the group consisting of $C_1$-$C_4$alkyl, $C_1$-$C_4$alkoxy, $C_1$-$C_4$alkoxy which is substituted in the alkyl part by hydroxyl, $C_1$-$C_4$alkoxy or sulfato;

halogen, carboxyl, hydroxyl, amino, N-mono- or N,N-di-$C_1$-$C_2$alkylamino, $C_2$-$C_4$alkanoylamino, ureido, sulfo, $C_1$-$C_4$alkylsulfonyloxy, $C_1$-$C_4$alkylsulfonylamino and a reactive radical of the formula (2c) defined in claim 5;

$(R_4')_{0-2}$ is 0 to 2 identical or different radicals $R_4'$ from the group consisting of $C_1$-$C_4$alkyl, $C_1$-$C_4$alkoxy, phenoxy, halogen, sulfo and hydroxyl;

$R_5$ is hydrogen or $C_1$–$C_4$alkyl;

$R_5'$ independently is as defined for $R_5$, or is $C_2$–$C_4$alkanoyl, $C_1$–$C_4$hydroxyalkyl, $C_1$–$C_4$sulfatoalkyl, $C_1$–$C_4$alkoxyalkyl or phenyl which is unsubstituted or substituted by methyl, methoxy, chlorine or sulfo;

$R_6$ is hydrogen, $C_1$–$C_4$alkyl or phenyl;

$(R_7)_{0-2}$ is 0 to 2 identical or different substituents from the group consisting of hydroxyl and a fibre-reactive radical of the formula (2a) defined in claim 5;

$R_8$ is hydrogen or $C_1$–$C_4$alkyl which is unsubstituted or substituted by hydroxyl, $C_1$–$C_4$alkoxy, sulfato, sulfo, halogen or cyano;

$R_9$ independently is as defined or $R_8$ or is $C_2$–$C_4$alkanoyl, benzoyl or a fibre-reactive radical of the formula (2c) defined in claim 5;

$R_{10}$ and $R_{10}'$ independently of one another are each carbamoyl, sulfomethyl or cyano;

$R_{11}$ is hydrogen or $C_1$–$C_4$alkyl, which is unsubstituted or substituted by a radical of the formula (2c) defined in claim 5;

$R_{12}$ and $R_{13}$ independently of one another are each hydrogen or $C_1$–$C_{12}$alkyl which is unsubstituted or substituted by hydroxyl, $C_1$–$C_4$alkoxy, phenoxy, sulfato, sulfo, carboxyl, amino or N-mono- or N,N-di-$C_1$–$C_4$alkylamino, which in its turn can be substituted in the alkyl part by hydroxyl, $C_1$–$C_4$alkoxy, phenoxy, sulfato, sulfo, carboxyl or a fibre-reactive radical of the formula (2c) defined in claim 5 and/or with the exception of methyl is uninterrupted or interrupted by —O—;

$R_{14}$ is methyl or carboxyl;

$R_{15}$ is is hydroxyl or amino;

$(R_{16})_{0-3}$ is 0 to 3 identical or different radicals $R_{16}$ from the group consisting of sulfo, halogen, hydroxyl, $C_1$–$C_4$alkoxy and $C_1$–$C_4$alkyl;

$(R_{17})_{0-2}$ is 0 to 2 identical or different radicals $R_{17}$ from the group consisting of $C_1$–$C_4$alkyl, $C_1$–$C_4$alkoxy, $C_1$–$C_4$alkoxy which is substituted in the alkyl part by hydroxyl, $C_1$–$C_4$alkoxy or sulfato, $C_2$–$C_4$alkanoylamino, ureido, halogen and sulfo;

$K_1$ independently is a radical of the formula (4a)–(4h) or (4j)–(4l) defined above;

$D_1$ is a phenyl or 1–2-naphthyl radical, which carries 1 to 3 identical or different radicals from the group consisting of sulfo, $C_1$–$C_4$alkyl, $C_1$–$C_4$alkoxy, halogen and fibre-reactive radicals of the formula (2a) or (2b) defined in claim 5;

D is the radical of a monoazo or disazo chromophore; and X is as defined in claim 5 and Y is vinyl, β-bromo- or β-chloroethyl, β-acetoxyethyl, β-benzoyloxyethyl, β-phosphatoethyl, β-sulfatoethyl or β-thiosulfatoethyl.

7. A mixture according to claim 5, in which s is the number 1 and

K is a radical of the formula

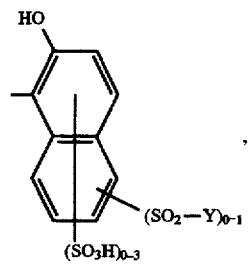
(4c')

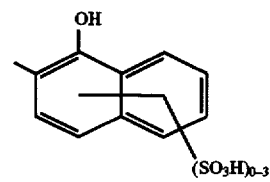
(4c")

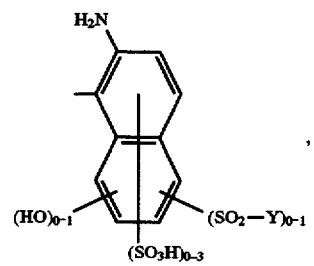
(4d')

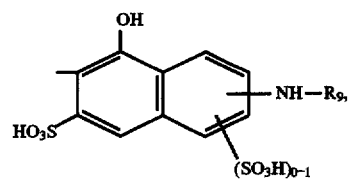
(4e')

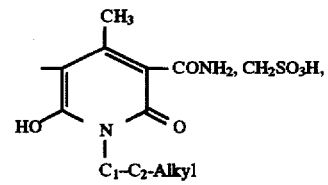
(4f')

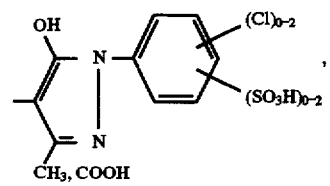
(4h')

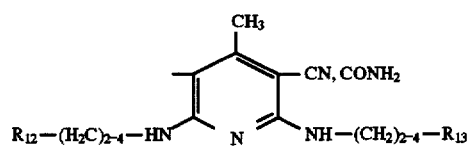
(4g')

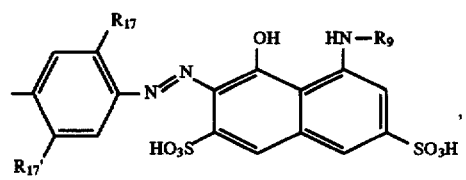
(4i')

-continued

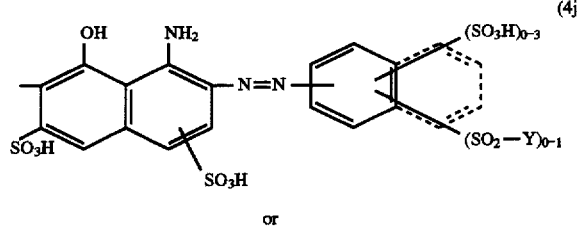

or

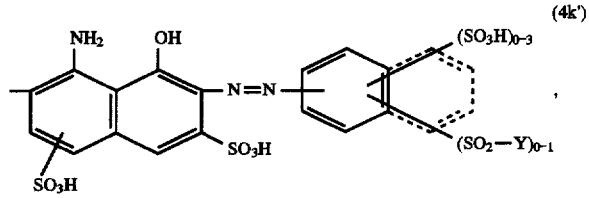

in which $R_9$ is acetyl, benzoyl or a radical of the formula (2c) defined in claim 5;

$R_{12}$ is hydrogen, hydroxyl or sulfato, $R_{13}$ independently is as defined for $R_{12}$, or is a radical of the formula (2c) defined in claim 5, $R_{17}$ and $R_{17}'$ independently of one another are each hydrogen, methyl, methoxy, 2-hydroxyethoxy, 2-sulfatoethoxy, acetylamino, propionylamino, ureido or sulfo and Y is vinyl, β-bromo- or β-chloroethyl, β-acetoxyethyl, β-benzoyloxyethyl, β-phosphatoethyl, β-sulfatoethyl or β-thiosulfatoethyl.

8. A mixture according to claim 5, in which
s is the number 2 and
K is the radical of a coupling component of the aminonaphtholsulfonic acid series which can undergo coupling in two positions or a radical of the formula

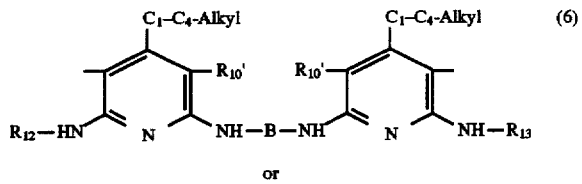

or

-continued

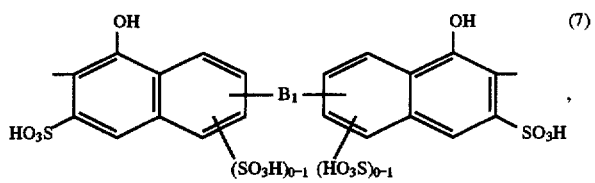

in which B is straight-chained or branched $C_2$–$C_{12}$alkylene, which is uninterrupted or interrupted by —O—, $B_1$ is a bridge member of the formula

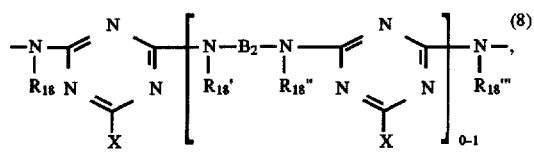

$R_{18}$, $R_{18}'$, $R_{18}''$ and $R_{18}'''$ independently of one another are each hydrogen or $C_1$–$C_4$alkyl which is unsubstituted or substituted by halogen, hydroxyl, cyano, $C_1$–$C_4$alkoxy, carboxyl, sulfo or sulfato, $B_2$ is an aliphatic, cycloaliphatic or aromatic bridge member, $R_{10}'$ is carbamoyl, sulfomethyl or cyano, $R_{12}$ and $R_{13}$ independently of one another are each hydrogen or $C_1$–$C_{12}$alkyl which is unsubstituted or substituted by hydroxyl, $C_1$–$C_4$alkoxy, phenoxy, sulfato, sulfo, carboxyl, amino or N-mono- or N,N-di-$C_1$–$C_4$alkylamino, which in its turn can be substituted in the alkyl part by hydroxyl, $C_1$–$C_4$alkoxy, phenoxy, sulfato, sulfo, carboxyl or a fibre-reactive radical of the formula (2c) defined in claim 5, and/or with the exception of methyl is uninterrupted or interrupted by —O—;

and X is as defined in claim 5.

9. A mixture according to claim 5, in which
s is the number 2 and
K is a radical of the formula

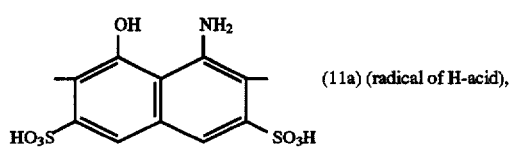

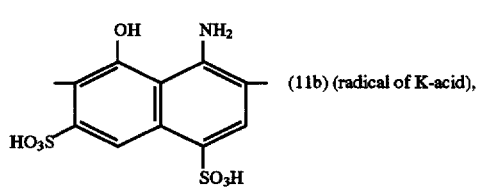

-continued

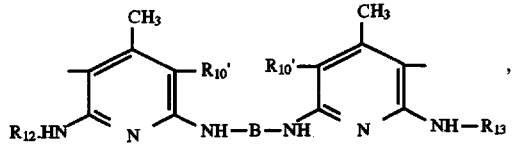 (6a)

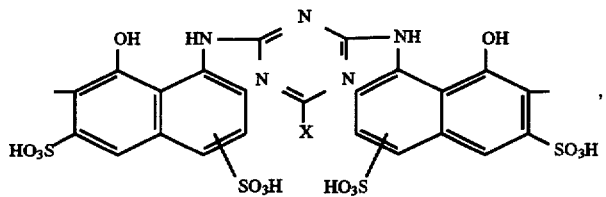 (7a)

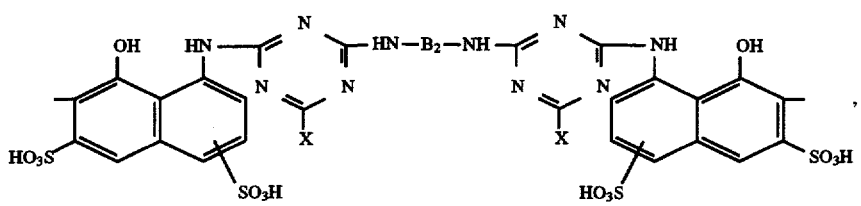 (7b)

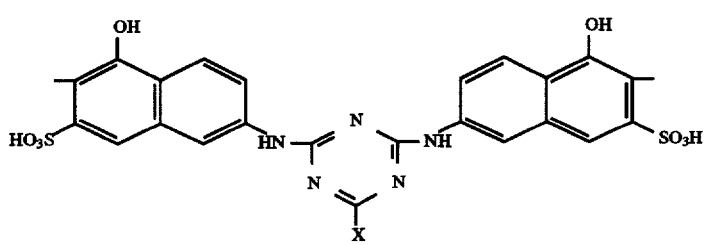 (7c)

or

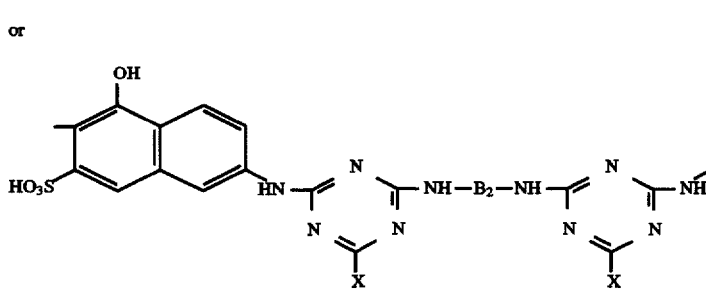 (7d)

in which $R_{10}'$ is cyano or carbamoyl, $R_{12}$ and $R_{13}$ independently of one another are each hydrogen or $C_1-C_6$alkyl which is unsubstituted or substituted by hydroxyl, methoxy, ethoxy, sulfato or sulfo, B is straight-chain or branched $C_2-C_6$alkylene, which can be unsubstituted or substituted by hydroxyl, sulfo or sulfato, $B_2$ independently is as defined for B, or is 1,3- or 1,4-phenylene which is unsubstituted or substituted by sulfo, methyl or methoxy, naphthylene which is substituted by 1 or 2 sulfo groups, or a radical of the formula

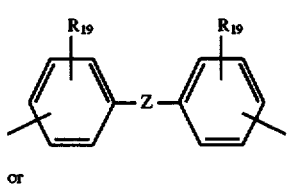 (10a)

or

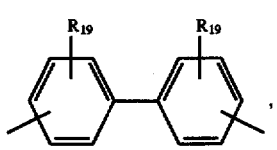 (10b)

in which

Z is —NHCONH—, —O—, —NH—, —CH=CH— or —CH$_2$— and $R_{19}$ is hydrogen or sulfo and X is as defined in claim 5.

10. A mixture according to claim 9, in which s is the number 2 and K is a radical of the formula (11a), (7a), (7b), (7c) or (7d), in which $B_2$ is straight-chain or branched $C_2$–$C_6$alkylene which is unsubstituted or substituted by hydroxyl, sulfo or sulfato and X is chlorine or fluorine.

11. A process for dyeing or printing a fibre material containing hydroxyl groups or containing nitrogen, which comprises applying to the fiber material in an aqueous dyebath a finctorial amount of the mixture of compounds according to claim 1 as fibre-reactive dyes.

* * * * *